(12) United States Patent
Yoshida et al.

(10) Patent No.: US 7,390,095 B2
(45) Date of Patent: Jun. 24, 2008

(54) PROJECTOR

(75) Inventors: Kanji Yoshida, Azumino (JP);
Hidemasa Yamakawa, Matsumoto (JP);
Joji Karasawa, Okaya (JP); Masafumi Sakaguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 153 days.

(21) Appl. No.: 11/243,334

(22) Filed: Oct. 5, 2005

(65) Prior Publication Data

US 2006/0077357 A1   Apr. 13, 2006

(30) Foreign Application Priority Data

Oct. 7, 2004   (JP) ............... 2004-294590

(51) Int. Cl.
G03B 21/14 (2006.01)
G03B 21/26 (2006.01)
G03B 21/28 (2006.01)
G03B 21/20 (2006.01)
G02B 5/30 (2006.01)
G02B 27/28 (2006.01)
G02B 27/14 (2006.01)
H04N 5/74 (2006.01)
G02F 1/1335 (2006.01)

(52) U.S. Cl. .............. 353/84; 353/20; 353/33; 353/34; 353/37; 353/82; 353/102; 359/490; 359/502; 359/634; 359/636; 359/638; 348/750; 348/757; 348/758; 349/9

(58) Field of Classification Search ............ 353/84, 353/33, 30–32, 34–37, 81, 82, 20, 102; 359/634, 359/490, 502, 618, 636, 638–640; 348/744, 348/750, 757, 758; 349/5, 7–9
See application file for complete search history.

(56) References Cited

U.S. PATENT DOCUMENTS

| | | | | |
|---|---|---|---|---|
| 5,626,409 | A * | 5/1997 | Nakayama et al. | 353/31 |
| 6,157,420 | A * | 12/2000 | Nakanishi et al. | 349/9 |
| 6,257,726 | B1 * | 7/2001 | Okuyama | 353/20 |
| 6,508,557 | B1 * | 1/2003 | Brennesholtz | 353/98 |
| 6,935,753 | B2 * | 8/2005 | Takezawa et al. | 353/119 |
| 6,956,624 | B2 * | 10/2005 | Hirata et al. | 348/744 |
| 2004/0246444 | A1 * | 12/2004 | Hirata et al. | 353/31 |

FOREIGN PATENT DOCUMENTS

| | | |
|---|---|---|
| JP | A 64-011289 | 1/1989 |
| JP | A 02-245749 | 10/1990 |
| JP | A 08-114779 | 5/1996 |
| JP | A 2001-264522 | 9/2001 |
| JP | A 2001-318221 | 11/2001 |
| WO | WO 94/22042 | 9/1994 |

* cited by examiner

*Primary Examiner*—Rochelle-Ann Blackman
(74) *Attorney, Agent, or Firm*—Oliff & Berridge, PLC

(57) ABSTRACT

Aspects of the invention can provide a projector that includes three optical modulators which modulate respectively red light, green light, and blue light, a color-synthetic optical system which synthesizes the light modulated by the three optical modulators, and a projection optical system which projects the light synthesized by the color-synthetic optical system. The color-synthetic optical system can include a first reflection film that reflects the green light, and a second reflection film that reflects the blue light, the first reflection film and the second reflection film are arranged in the shape of an X character, and a wavelength in which a reflectance factor of the first reflection film comes to 50% can be longer than a wavelength in which a reflectance factor of the second reflection film comes to 50%.

8 Claims, 11 Drawing Sheets

PROJECTOR

INCORPORATION BY REFERENCE

This application claims the benefit of Japanese Patent Application No. 2004-294590, filed Oct. 7, 2004. The entire disclosure of the prior application is hereby incorporated by reference herein in its entirety.

BACKGROUND

Aspects of the invention can relate to a projector which projects an image by use of an optical modulator, such as a liquid crystal panel or the like. There are related art projectors which color-synthesize image light of each color emitted from a liquid crystal panel of each color illuminated by illumination light of blue, red, and green, by a synthetic optical system having structure in which a pair of multi-layer films for blue reflection and for red reflection are arranged in the shape of an X character. See, for example, JP-A-64-11289, JP-A-8-114779, JP-A-2-245749, JP-A-2001-264522 and JP-A-2001-318221. In the related art projectors, blue image light is reflected by the multi layer film for blue reflection, red image light is reflected by the multi layer film for red reflection, and the both multi layer films transmit green image light, whereby superposition of the image light, that is, color synthesis is performed. See, for example, JP-A-64-11289, JP-A-8-114779, JP-A-2-245749, JP-A-2001-264522 and JP-A-2001-318221.

In a first projector of these related art projectors, in order to heighten efficiency of use for polarization light in a specified direction which is utilized for each color, of source light, a polarization rotary element which changes a polarization direction to 90° can be arranged between a liquid crystal panel arranged on a red or blue optical path and a synthetic dichroic prism arranged on an exit side of the light (JP-A-64-11289). Further, in a second related art projector, in order to heighten efficiency of use for polarization light in a specified direction which is utilized for each color, of source light, transmission characteristic of a dichroic prism for separation and transmission characteristic of a synthetic dichroic prism are adjusted to the polarized direction of each color light (JP-A-8-114779). Further, also in a third related art projector, in order to heighten efficiency of use for polarization light in a specified direction which is used for each color, of source light, transmission characteristic of a dichroic prism for separation and transmission characteristic of a synthetic dichroic prism are adjusted to the polarized direction of each color light (JP-A-2-245749). Further, in a fourth related art projector, in consideration with the influence of an incident angle to a synthetic dichroic prism on transmission characteristic, a half wavelength for S polarization of a multilayer film for red reflection, and a half wavelength for S polarization of a multilayer film for blue reflection are set in a predetermined range (JP-A-2001-264522). Further, in a fifth related art projector, by controlling the structure of a multilayer film for red or blue reflection incorporated into a synthetic dichroic prism, difference between an objected half wavelength for S polarization of the multi layer film and an obtained half wavelength for P polarization are reduced, and characteristic deterioration with change in an incident angle is prevented (JP-A-2001-318221).

Further, as another related art projector, there is a projector which separates light from a light source into three-color light, in which a light guide unit such as a relay optical system is arranged on a path of green illumination light thereby to compensate a difference in an optical path between the green light and the other two color-light (WO94/22042). In this projector, in a synthetic optical system, red image light is reflected by a multi layer film for red reflection, green image light is reflected by a multi layer film for green reflection, and the both multi layer films transmit blue image light, whereby color synthesis of an image is performed.

However, in case of the related art projector using the synthetic optical system including the multi-layer film for blue reflection and the multi layer film for red reflection, an illumination device for illuminating the liquid panel of each color is restricted to the constitution in which the green light is branched in the center. Namely, this synthetic optical system is restricted to optical-path arrangement in which the green image light is caused to go straight ahead and the blue and red image light are caused to couple to each other from both sides of the green optical path. Therefore, it is difficult to realize a projector in which on a green optical path a relay optical system that makes its relative optical path long is arranged.

Further, in the related art projector in which the relay optical system is arranged on the green optical path, a cross dichroic prism that is a synthetic optical system is composed of the multi layer film for blue or red reflection and the multilayer film for green reflection. However, regarding image light in a boundary wavelength of green and blue, it has been known that a ghost image is formed on a screen by multiple reflection in the both multi layer films.

SUMMARY

An aspect of the invention can provide a projector, which can realize easily optical path constitution in which a relay optical system is arranged on a green optical path, and can prevent or reduce formation of a ghost image caused by multiple reflection in a synthetic optical system.

A first exemplary projector according to an aspect of the invention can include three optical modulators which modulate respectively red light, green light, and blue light, a color-synthetic optical system which synthesizes the light modulated by the three optical modulators, and a projection optical system which projects the light synthesized by the color-synthetic optical system. Herein, the color-synthetic optical system includes a first reflection film that reflects green light, and a second reflection film that reflects blue light. The first reflection film and the second reflection film can be arranged in the shape of an X character, and a wavelength in which a reflectance factor of the first reflection film comes to 50% is longer than a wavelength in which reflectance factor of the second reflection film comes to 50%. The reflectance factor takes a polarized direction of each color light that is incident on the reflection film into consideration. Therefore, in case that the polarized direction of each color light that is incident on a pair of reflection films in the color-synthetic optical system is different partially, the reflectance factor according to its polarized direction is the standard of comparison.

In the first projector, in the color-synthetic optical system, optical-path arrangement in which the red light is caused to go straight ahead and the green light and the blue light are coupled to each other from both sides of the red light becomes possible, so that a type of projector in which a relay optical system is arranged on a illumination optical path of, for example, green light is realized readily. Further, in the first projector, since the wavelength in which the reflectance factor of the first reflection film comes to 50% is longer than the wavelength in which the reflectance factor of the second reflection film comes to 50%, it is possible to suppress multiple reflection including a step in which light in a boundary wavelength between green light and blue light is reflected by the first and second reflection films and reverses, and it is possible to reduce possibility in which a ghost image is projected on a screen together with an image. Further, by appropriately adjusting reflection characteristic of the first reflection film, brightness of green image light can be readily controlled. Namely, though the light quantity of the green light is liable to increase in a lamp light source, the light quantity of the green light can be controlled without using a ND filter or the like that is easy to vary thermally. Therefore, white balance can be controlled without deterioration of contract.

Further, a second exemplary projector according to another aspect of the invention can include three optical modulators which modulate respectively red light, green light, and blue light, a color-synthetic optical system which synthesizes the light modulated by the three optical modulators, and a projection optical system which projects the light synthesized by the color-synthetic optical system. Herein, the color-synthetic optical system can include a first reflection film that reflects green light, and a second reflection film that reflects red light, the first reflection film and the second reflection film are arranged in the shape of an X character, and a wavelength in which a reflectance factor of the first reflection film comes to 50% is shorter than a wavelength in which a reflectance factor of the second reflection film comes to 50%.

In the second exemplary projector, in the color-synthetic optical system, optical-path arrangement becomes possible in which the blue light is caused to go straight ahead and the green light and the red light are coupled to each other from both sides of the blue light, so that a type of projector in which a relay optical system is arranged on a illumination light path of, for example, the green light is realized readily. Further, in the second projector, since the wavelength in which the reflectance factor of the first reflection film comes to 50% is shorter than the wavelength in which the reflectance factor of the second reflection film comes to 50%, it is possible to suppress multiple reflection including a step in which light in a boundary wavelength between the green light and the red light is reflected by the first and second reflection films and reverses, and it is possible to reduce possibility in which a ghost image is projected on a screen. Further, by appropriately adjusting reflection characteristic of the first reflection film, white balance can be controlled without deterioration of contract.

Further, a third exemplary projector according to another aspect of the invention can include three optical modulators which modulate respectively red light, green light, and blue light, a color-synthetic optical system which synthesizes the light modulated by the three optical modulators, and a projection optical system which projects the light synthesized by the color-synthetic optical system. Herein, the color-synthetic optical system includes a first reflection film that reflects green light, and a second reflection film that reflects blue light, the first reflection film and the second reflection film are arranged in the shape of an X character, reflectance characteristic of the first reflection film and reflectance characteristic of the second reflection film are partially superimposed in a predetermined wavelength area, and in the optical path for green light or blue light, a filter for removing the light in the predetermined wavelength area is provided.

In the third projector, in the color-synthetic optical system, optical-path arrangement becomes possible in which the red light is caused to go straight ahead and the green light and the blue light are coupled to each other from both sides of the red light, so that a type of projector in which a relay optical system is arranged on a illumination light path of, for example, green light is realized readily. Further, in the exemplary third projector, since the filter for removing the light in the predetermined wavelength area is provided in the optical path for green light or blue light, it is possible to suppress multiple reflection including a step in which light in a boundary wavelength between green light and blue light is reflected by the first and second reflection films and reverses, and it is possible to reduce possibility in which a ghost image is projected on a screen. Further, by appropriately adjusting characteristic of the filter, white balance can be controlled without deterioration of contract.

Further, a fourth exemplary projector according to another aspect of the invention can include three optical modulators which modulate respectively red light, green light, and blue light, a color-synthetic optical system which synthesizes the light modulated by the three optical modulators, and a projection optical system which projects the light synthesized by the color-synthetic optical system. Herein, the color-synthetic optical system can include a first reflection film that reflects green light, and a second reflection film that reflects red light; the first reflection film and the second reflection film are arranged in the shape of an X character, reflectance characteristic of the first reflection film and reflectance characteristic of the second reflection film are partially superimposed in a predetermined wavelength area, and in the optical path for green light or red light, a filter for removing the light in the predetermined wavelength area is provided.

In the fourth exemplary projector, in the color-synthetic optical system, optical-path arrangement becomes possible in which the blue light is caused to go straight ahead and the green light and the red light are coupled to each other from both sides of the blue light, so that a type of projector in which a relay optical system is arranged on a illumination light path of, for example, green light is realized readily. Further, in the fourth projector, since the filter for removing the light in the predetermined wavelength area is provided in the optical path for green light or red light, it can be possible to suppress multiple reflection including a step in which light in a boundary wavelength between green light and red light is reflected by the first and second reflection films and reverses, and it is possible to reduce possibility in which a ghost image is projected on a screen together with an image. Further, by appropriately adjusting characteristic of the filter, white balance can be controlled without deterioration of contract.

Further, in the above projector, it is preferable that the filter is a transmission type optical element which suppresses transmission of the light in a predetermined wavelength area. In this case, removal of light in the predetermined wavelength area of the target can be achieved readily and at a low cost.

Further, in the above projector, it is preferable that the filter is a reflection type optical element which suppresses reflection of the light in a predetermined wavelength area. In this case, removal of light in the predetermined wavelength area of the target can be achieved with space-saving by appropriately using a mirror arranged on an optical path in order to bend the optical path.

Further, it is preferable that the projector further can include a color-separation optical system which separates light emitted from a light source into red light, green light, and blue light thereby to provide the separation light as the predetermined polarized light. In this case, not only the red light, the green light, and the blue light can be obtained by use of a single light source, but also the respective color light can be aligned in the predetermined polarizing directions thereby to be utilized efficiently.

Further, it is preferable that an optical path between the light source and the optical modulator for green light is longer than an optical path between the light source and the optical modulator for red light or blue light; and between the color-separation optical system and the optical modulator for green light, a relay optical system is arranged, which has a first lens arranged on a light exit side of the color-separation optical system, a second lens arranged on a light incident side of the optical modulator for green light, and a third lens arranged between the first lens and the second lens. In this case, since the relay optical system is arranged on the optical path of the green light, loss of the green light is easy to be produced. However, in a lamp light source in which the light quantity of the green light is large, preferably, the loss of the green light gives an advantageous influence on achievement of natural white balance. Further, in this case, since the green light has comparatively high in visual sensitivity, it has a large influence on the white balance. However, by appropriately adjusting the relay optical system on the optical path of the green light, illuminance of the green light on the optical modulator for the green light can be readily controlled.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Figure 1:
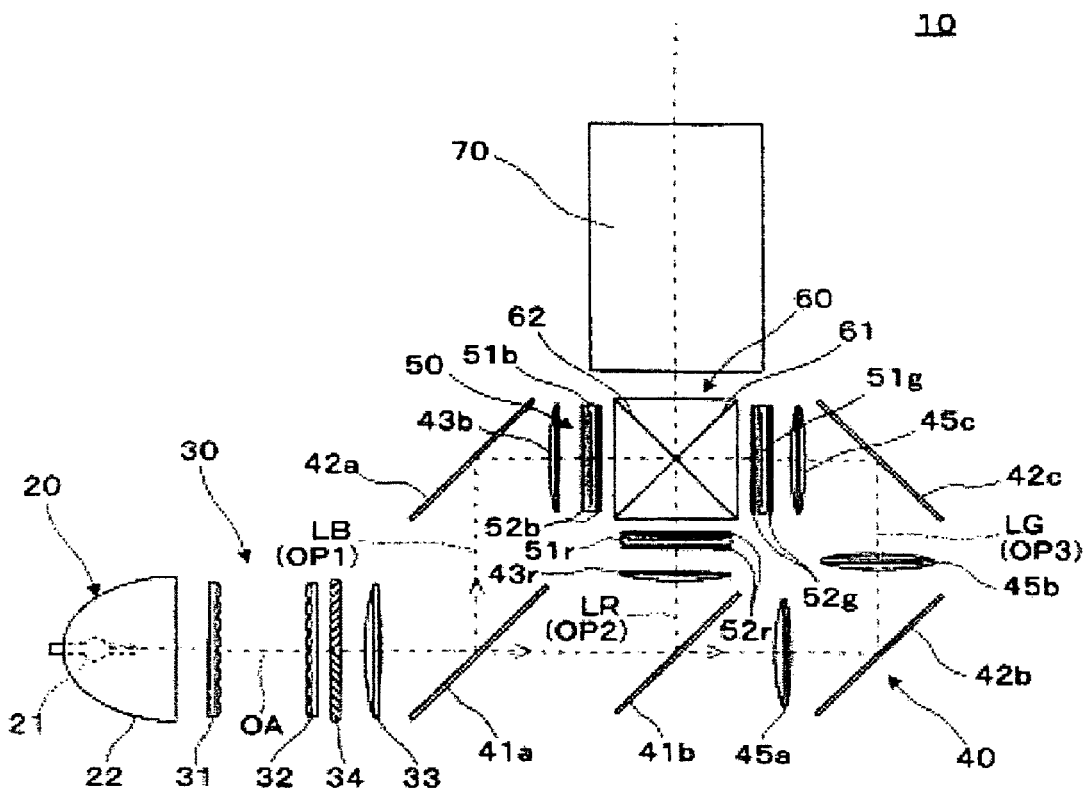
FIG. 1 is a diagram for explaining an optical system of a projector according to a first exemplary embodiment.

FIG. 1 is a diagram for explaining a projector according to a first exemplary embodiment of the invention. This projector 10 can include a light source device 20 which generates source light, a uniformization optical system 30 which uniformizes illumination light from the light source device 20, a dividing illumination system 40 which divides the illumination light from the uniformization optical system 30 into three-color (red, green and blue) light, an optical modulation part 50 illuminated by illumination light of each color emitted from the dividing illumination system 40, a cross dichroic prism 60 which synthesizes the modulated light of each color from the optical modulation part 50, and a projection lens 70 which projects an image light through the cross dichroic prism 60 on a screen (not shown).

Here, the light source device 20 can include a lamp body 21 which forms a light emission part shown by dotted lines, and a parabolic concave mirror 22 which collimates the source light emitted from the lamp body 21. The lamp body 21 of them is composed of a lamp light source, such as a high pressure mercury-vapor lamp, and generates nearly white source light. Further, the concave mirror 22 reflects a light beam radiated from the lamp body 21, and causes the reflected light to be incident on the uniformization optical system 30 as parallel luminous flux. In place of the parabolic concave mirror 22, other concave mirrors which are not parabolic, such as a spherical concave mirror and an ellipsoidal concave mirror, may be used. In case that such the concave mirrors are used, as long as a collimation lens is arranged between the recess mirror 22 and the uniformization optical system 30, the parallel luminous flux can be emitted from the light source device 20.

The uniformization optical system 30 can include a pair of fly's-eye optical systems 31, 32, a superposition lens 33 for superposing wavefront splitting light, and a polarizing conversion member 34 which converts the illumination light into the predetermined polarization component. The fly's-eye optical system pair 31, 32 comprises plural element lenses arranged in the matrix-shape, and these element lenses divide the illumination light from the light source device 20 thereby to collect and diverge the divided light individually. The polarizing conversion member 34 converts the illumination light emitted from the fly's-eye optical systems 31, 32 into one kind of polarization light (for example, only S-polarization component perpendicular to a paper surface of FIG. 1), and supplies the polarization light to a subsequent-step optical system. The superposition lens 33 brings the illumination light through the polarizing conversion member 34 into convergence appropriately as a whole, thereby to make superposition illumination for an optical modulator of each color provided for the optical modulation part 50 possible. Namely, the illumination light through the both fly's-eye optical systems 31, 32 and the superposition lens 33 superposition-illuminates uniformly, through a dividing illumination system 40 which will be described below in detail, an image forming area of the optical modulator of each color constituting the optical modulation part 50, that is, an image forming area of liquid crystal panel 51b, 51r, 51g of each color.

The dividing illumination system 40 can include first and second dichroic mirrors 41a and 41b, reflection mirrors 42a, 42b, and 42c, field lenses 43r and 43b, and first to third lenses 45a, 45b, and 45c. A color separation optical system including the first and second dichroic mirrors 41a and 41b of these parts separates the illumination light into three luminous fluxes of red light, green light, and blue light. Namely, the first dichroic mirror 41a reflects blue light LB of the three-color (red(R), blue (B), and green (G)) light, and transmits green light LG and red light LR. Further, the second dichroic mirror 41b reflects the red light LR of the incident green light LG and red light LR, and transmits the green light LG.

In this dividing illumination system 40, the illumination light emitted from the light source device 20 through the uniformization optical system 30 is firstly incident on the first dichroic mirror 41a. The blue light LB reflected by the first dichroic mirror 41a is guided to a first optical path OP1, and incident through the reflection mirror 42a on the field lens 43b for adjusting an incident angle. Further, the red light LR which has passed through the first dichroic mirror 41a and been reflected by the second dichroic mirror 41b is guided to a second optical path OP2 and incident on the field lens 43r. Further, the green light LG which has passed through the second dichroic mirror 41b is guided to a third optical path OP3, and passes through the first to third lenses 45a, 45b, and 45c via the reflection mirrors 42b and 42c. A relay optical system including these lenses 45a, 45b, and 45c is arranged on the third optical path OP3 for green light, which is longest in distance of the optical path from the light source device 20 to the liquid crystal panel 51b, 51r, 51g of each color. In this relay optical system, an image of the first lens 45a on the incident side is transmitted through the intermediate second lens 45b to the third lens 45c on the exit side nearly as it is, whereby decrease in efficiency of light utilization by light diffusion is prevented.

By moving, for example, the intermediate lens 45b in the relay optical system along an optical axis continuously or stepwise, illumination area size in the position of the liquid crystal panel 51g, that is, illuminance of the green light LG on an image forming area of the liquid crystal panel 51g can be changed arbitrarily. Namely, illuminance of the blue light LB on an image forming area of the liquid crystal panel 51b and illuminance of the red light LR on an image forming area of the liquid crystal panel 51r do not change but are constant and nearly equal, while the illuminance of the green light LG on the image forming area of the liquid crystal panel 51g varies according to the position of the lens 45b. By utilizing this, white balance of a synthetic image formed through the respective liquid crystal panels 51b, 51r, and 51g and to be projected on the screen by the projection lens 70 can be appropriately controlled optically on the green light LG.

The optical modulation part 50 includes three liquid crystal panels 51b, 51r and 51g on which illumination light LB, LR, and LG of three colors are respectively incident, and three sets of polarization filters 52b, 52r, and 52g each of which is arranged so as to interpose each liquid crystal panel 51b, 51r, 51g between. Here, for example, the liquid crystal panel 51b for the blue light LB, and a pair of polarization filters 52b, 52b that hold this panel 51b between constitute a liquid crystal light bulb for luminance-modulating the illumination light two-dimensionally. Similarly, the liquid crystal panel 51r for the red light LR, and the corresponding polarization filters 52r, 52r also constitute a liquid crystal light bulb; and the liquid crystal panel 51g for the green light LG, and the corresponding polarization filters 52g, 52g also constitute a liquid crystal light bulb.

In this optical modulation part 50, the blue light LB guided on the first optical path OP1 is incident through the field lens 43b on the image forming area of the liquid crystal panel 51g. The red light LR guided on the second optical path OP2 is incident through the field lens 43r on the image forming area of the liquid crystal panel 51r. The green light LG guided on the third optical path OP3 is incident through the relay optical system comprising the lenses 45a, 45b, and 45c on the image forming area of the liquid crystal panel 51g. Each of the liquid crystal panels 51b, 51r, and 51g is a light non-emitting and transmission type of optical modulator for changing special distribution in the polarizing direction of the incident illumination light. In each color light LB, LR, LG which has been incident on each liquid crystal panel 51b, 51r, 51g, according to a drive signal or an image signal which is input to each liquid crystal panel 51b, 51r, 51g as an electric signal, the polarized state is adjusted by the pixel. At this time, by the polarization filter 52b, 52r, 52g, the polarizing direction of the illumination light which is incident on each liquid crystal panel 51b, 51r, 51g is adjusted, and modulation light in the predetermined polarizing direction is taken out from the light emitted from each liquid crystal panel 51b, 51r, 51g.

The cross dichroic prism 60 is a color-synthetic optical system. Inside the cross dichroic prism 60, a first dichroic film (specifically, dielectric multilayer film) for blue light reflection 61, and a second dichroic film (specifically, dielectric multilayer film) for green light reflection 62 are arranged in the shape of an X character. In this cross dichroic prism 60, the blue light LB from the liquid crystal panel 51b is reflected by the first dichroic film 61 thereby to be emitted to the left in the traveling direction, the red light LR from the liquid crystal panel 51r is caused to go straight ahead and emitted through the both dichroic films 61 and 62, and the green light LG from the liquid crystal panel 51g is reflected by the second dichroic film 62 thereby to be emitted to the right in the traveling direction.

Image light thus synthesized by the cross dichroic prism 60 is projected through the projection lens 70 that is a projection optical system, onto a screen (not shown) at the appropriate magnification as a color image.

Figure 2:
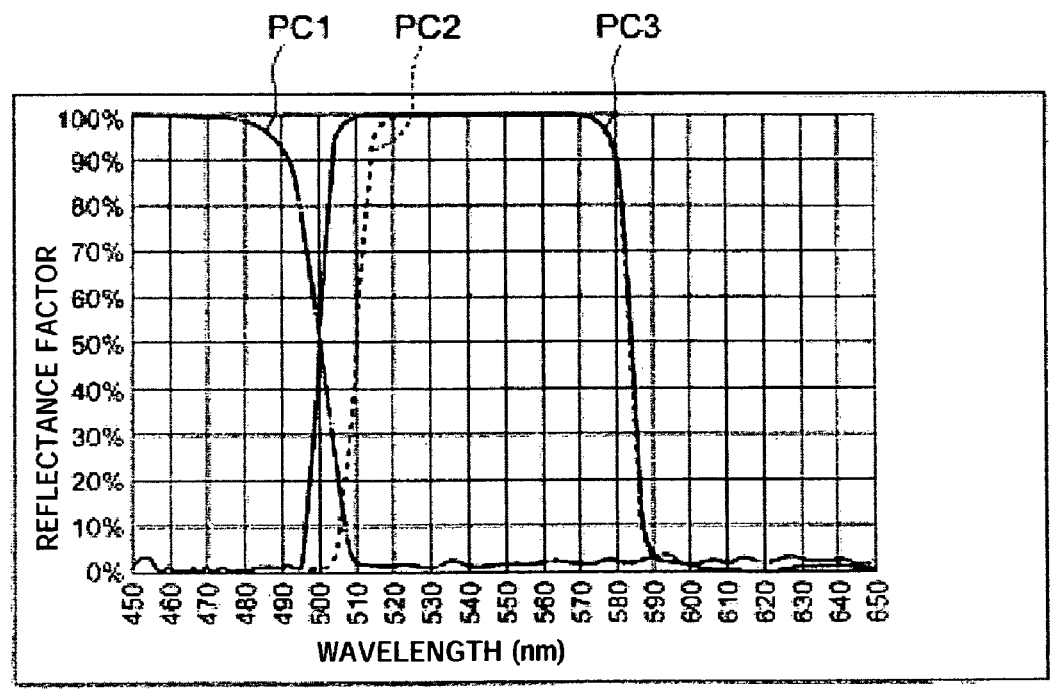
FIG. 2 is a graph showing reflection characteristic of a cross dichroic prism shown in FIG. 1.

FIG. 2 is a graph for explaining conceptually reflection characteristic of the dichroic films 61 and 62 constituting the cross dichroic prism 60 in FIG. 1 in consideration of the polarizing direction (for example, perpendicular to a paper surface of FIG. 1) of the incident light. The first dichroic film 61 has reflection characteristic PC1 shown by chain lines, and reflects the blue light overall. Further, the second dichroic film 62 has reflection characteristic PC2 shown by dotted lines, and reflects the green light overall. In result, the both dichroic films 61 and 62 transmit the red light. In the reflection characteristic PC1 of the first dichroic film 61, a half wavelength in which a reflectance factor comes to 50% on a long-wavelength side is about 500 nm. In the reflection characteristic PC2 of the second dichroic film 62, a half wavelength in which a reflectance factor comes to 50% on a short-wavelength side is about 510 nm. Namely, the half wavelength of the second dichroic film 62 is longer than the half wavelength of the first dichroic film 61 by about 10 nm. Reflection characteristic PC3 shown by solid lines is a related art type of reflection characteristic in which the reflection characteristic PC2 is changed on an edge position on the short-wavelength side, and a half wavelength in which a reflectance factor comes to 50% is about 500 nm. This value coincides with the half wavelength of the reflection characteristic PC1 of the first dichroic film 61.

Here, there is hardly an overlapping portion between the reflection characteristic PC1 of the first dichroic film 61 and the reflection characteristic PC2 of the second dichroic film 62. Namely, blue-green boundary light in their boundary wavelength (500 to 510 nm) is hardly reflected on the first dichroic film 61 and also on the second dichroic film 62. Therefore, regarding image light in the boundary wavelength which has entered into the cross dichroic prism 60 in FIG. 1 from the first optical path OP1 side, even if it is a little reflected by the first dichroic film 61, since the reflection amount on the second dichroic film 62 is nearly zero, it is possible to effectively prevent previously return light which is formed by twice reflection of the blue-green boundary light and reverses from being generated. Further, regarding image light in the boundary wavelength which has entered into the cross dichroic prism 60 from the third optical path OP3 side, even if it is a little reflected by the second dichroic film 62, since the reflection amount on the first dichroic film 61 is nearly zero, it is possible to effectively prevent previously the return light which is formed by twice reflection of the blue-green boundary light and reverses from being generated.

Figure 3:
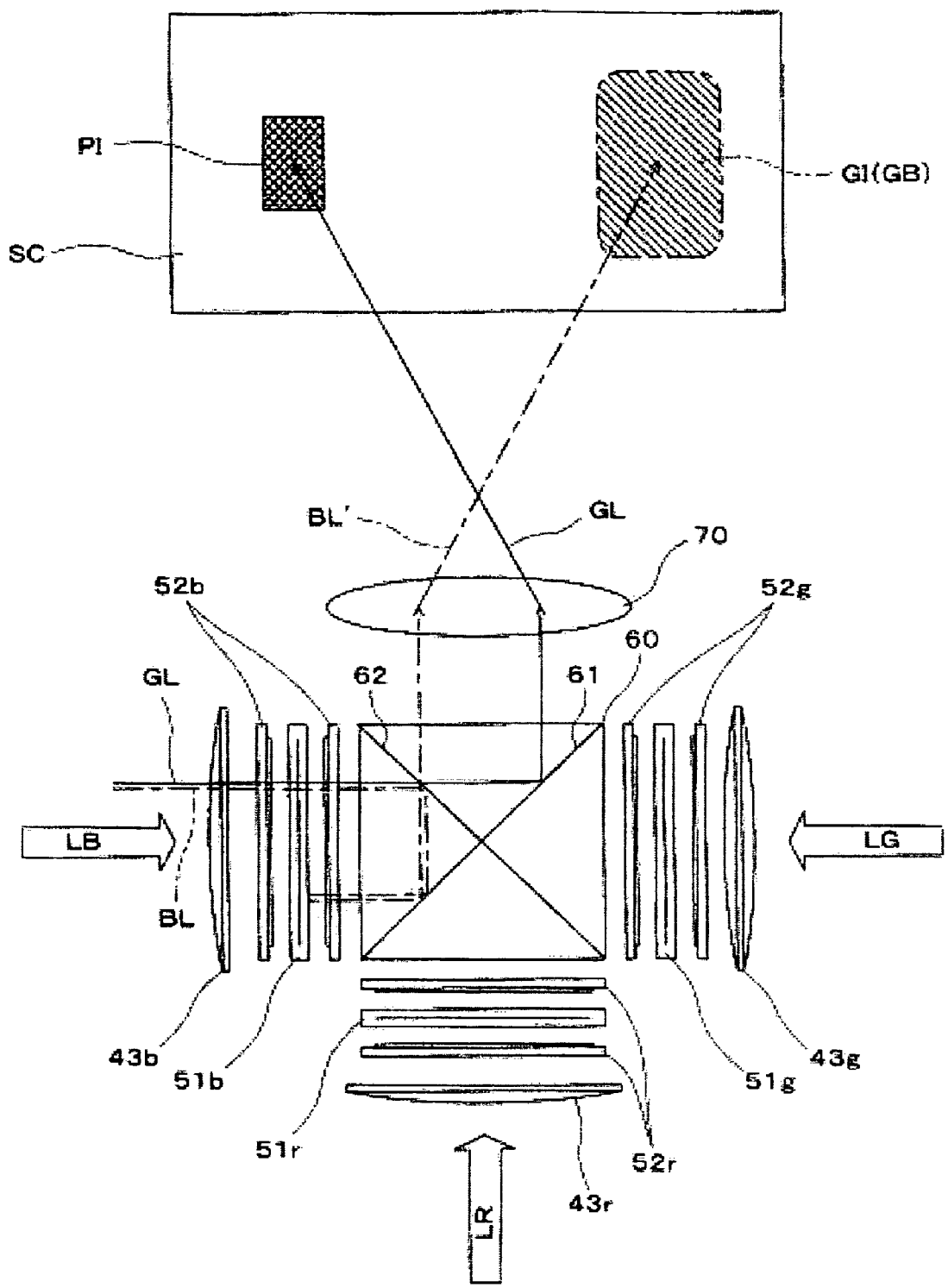
FIG. 3 is an enlarged view for explaining the characteristic operation of the projector in FIG. 1.

FIG. 3 is a diagram for explaining prevention of the generation of the return light from the cross dichroic prism 60. General light GL, which has a representative intermediate wavelength, of the blue light LB that has passed through the liquid crystal panel 51b passes through the second dichroic film 62 completely, is reflected by the first dichroic film 61, is incident on the projection lens 70 shown schematically, and forms a blue image on the screen SC. In the shown example, by the general light GL, an appropriate image is projected at an image area PI on the screens SC. On the other hand, boundary light BL, which has a boundary wavelength (specifically, wavelength 500 to 510 nm), of the blue light LB that has passed through the liquid crystal panel 51b passes through both of the first and second dichroic films 61 and 62. Therefore, even if the boundary light BL illuminates the liquid crystal panel 51g slightly from the reverse direction, there is hardly the influence on formation of a projection image.

In case that the second dichroic film 62 has the reflection characteristic PC3 shown in FIG. 2 as a comparative example, the boundary light BL having the boundary wavelength, of the blue light LB that has passed through the liquid crystal panel 51b is partially reflected by the second dichroic film 62, its optical path is bent at an angle 90°, and the reflected light is incident on the first dichroic film 61. Such the boundary light BL is partially reflected also by the first dichroic film 61, and its optical path is further bent at an angle 90°. Namely, the boundary light BL, as return light that has moved in parallel, is successively incident on the liquid crystal panel 51b or the like. Since the surface of the liquid crystal panel 51b or the like has a reflectance factor that is not zero, the return light that has been incident on the liquid crystal panel 51b is reflected by the liquid crystal panel 51b, and transmitted forward again as boundary light BL'. Such the boundary light BL' is partially reflected by the first dichroic film 61 as advance light, partially passes through the second dichroic film 62, is incident on the projection lens 70, and forms a weak ghost image on the screen SC. In the shown example, a faint ghost image corresponding to the image in the image area PI is projected at a ghost area GI located on the opposite side to the image area PI side on the screen SC. Thought such the ghost image, in case that its luminance is large, becomes a ghost image itself (ghost image in a narrow sense), it, in case that the luminance is small, is observed as color unevenness and luminance unevenness. On the other hand, in case that the half-reflection characteristic of the second dichroic film 62 is appropriately adjusted like that in this embodiment, occurrence of the ghost image including the color unevenness and the luminance unevenness can be prevented certainly.

Figure 4:
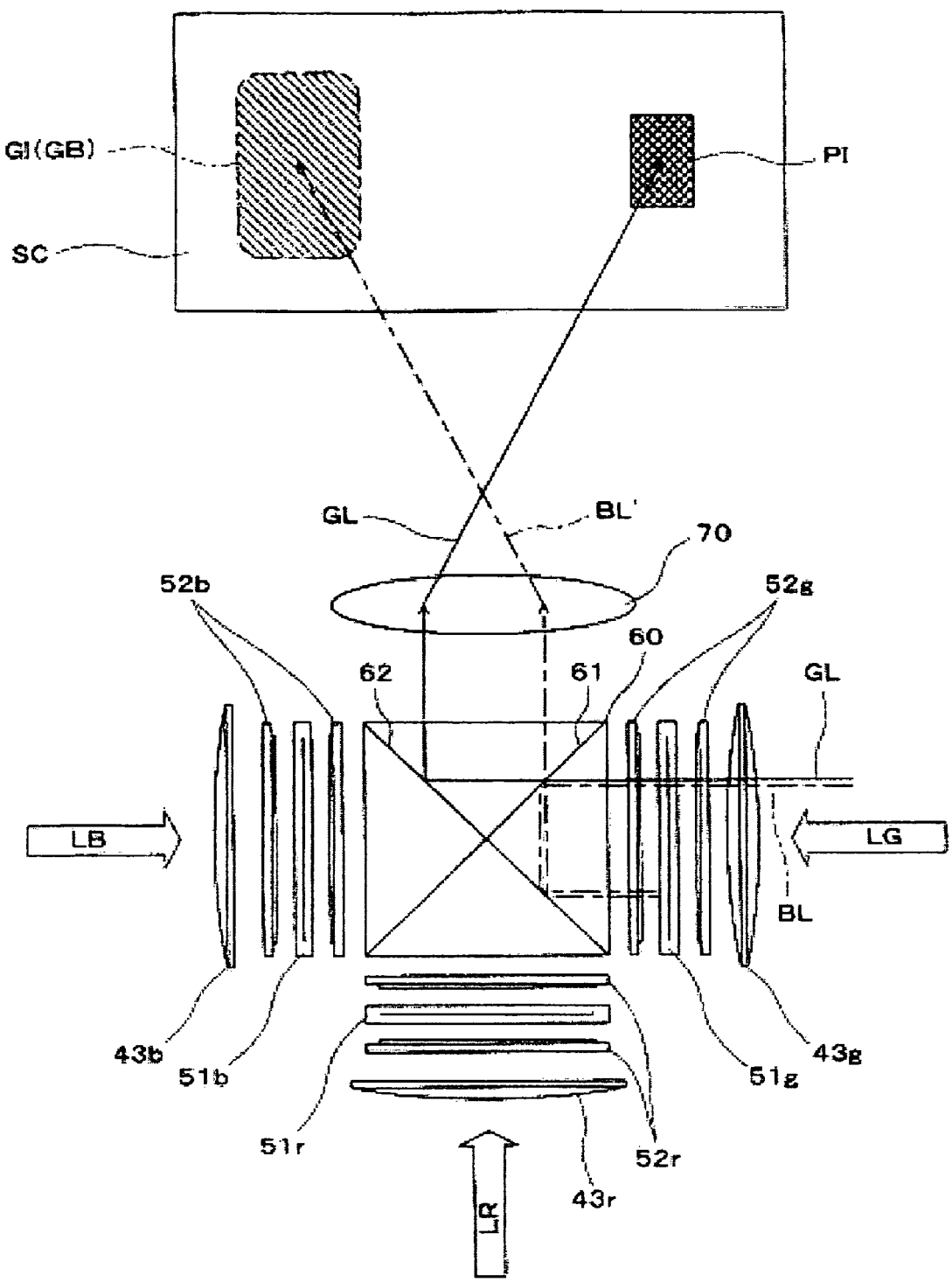
FIG. 4 is an enlarged view for explaining the characteristic operation of the projector in FIG. 1 from another viewpoint.

FIG. 4 is a diagram for explaining the prevention of the generation of the return light from the cross dichroic prism 60 from another viewpoint. In this case, the boundary light BL of wavelength 500 to 510 nm is guided to the liquid crystal panel 51g from the third optical path OP3 side. General light GL of the green light LG passes through the first dichroic film 61 completely, is reflected by the second dichroic film 62, is incident on the projection lens 70, and forms a green image on the screen SC. On the other hand, boundary light BL of the green light LG that has passed through the liquid crystal panel 51g passes through both of the first and second dichroic films 61 and 62, and has hardly the influence on formation of a projection image.

In case that the second dichroic film 62 has the reflection characteristic PC3 shown in FIG. 2 as a comparative example, the boundary light BL having the boundary wavelength, of the green light LG that has passed through the liquid crystal panel 51g is partially reflected by the first and second dichroic films 61 and 62, and the reflected light is successively incident on the liquid crystal panel 51g or the like as return light that has moved in parallel. The return light that has been incident on the liquid crystal panel 51g is reflected by the liquid crystal panel 51g, and transmitted forward again as boundary light BL'. Such the boundary light BL' is partially reflected by the second dichroic film 62 as advance light, partially passes through the first dichroic film 61, is incident on the projection lens 70, and forms a weak ghost image corresponding to an image at an image area PI in a ghost area GI on the screen SC.

The operation of the projector 10 according to the exemplary embodiment will be described below. The illumination light from the light source device 20 is uniformized through the uniformization optical system 30 and its polarized direction is made uniform. Thereafter, the illumination light is color-separated by the first and second dichroic mirrors 41a and 41b provided for the dividing illumination system 40, and the divided light are incident respectively on the corresponding liquid crystal panels 51b, 51r, and 51g as each color light LB, LR, LG. Each liquid crystal panel 51b, 51r, 51g is modulated by the image signal from the outside thereby to have a two-dimensional refractive index profile, and modulates each color light LB, LR, LG in a two-dimensional space manner by the pixel. Each color light LB, LR, LG thus modulated by each liquid crystal panel 51b, 51r, 51g, that is, image light of the respective colors are synthesized by the cross dichroic prism 60, and thereafter the synthesized light is incident on the projection lens 70. The image light that has been incident on the projection lens 70 is projected at appropriate magnification on the screen SC.

In this projector 10, overlap or superimposition of the reflection characteristics of the dichroic film pair 61, 62 is prevented. Therefore, it is possible to prevent the boundary light BL of the blue light LB or the green light LG that is incident on the cross dichroic prism 60 from becoming the return light which is reflected by the both dichroic films 61 and 62 and is incident on the liquid crystal panel 51g or the like. Namely, unlike the case where the both dichroic films 61 and 62 have the overlapping reflection characteristics, it is possible to prevent or reduce the return light from these dichroic films 61 and 62 from being reflected on the liquid crystal panel 51b or the like thereby to become the advance light, and to prevent or reduce the ghost image or the like from being formed on the screen SC by such the advance light.

Further, in the projector 10, as shown in FIG. 2, the half-wavelength of the reflection characteristic PC2 of the second dichroic film 62 is longer by about 10 nm than the half-wavelength of the reflection characteristic PC3 in the comparative example. Therefore, the brightness of the green image light in which the light quantity is liable to become comparatively large can be reduced readily regarding the boundary light BL. Generally, since the green light LG is comparatively high in visual sensitivity, it has the large influence on white balance. Further, the light source device 20 having the lamp body 21 composed of the high pressure mercury-vapor lamp is easy to produce unevenness in the relative light quantity of the green light LG. Therefore, by cutting the boundary light BL while preventing the overlap or the superimposition of the reflection characteristics of the dichroic films 61 and 62, the light quantity of the green light LG can be adjusted without using a ND filter or the like that is easy to vary thermally, and the white balance can be controlled in the predetermined range without deteriorating the contract. Further, in case of the high pressure mercury-vapor lamp, the light quantity of the green light LG tends to becomes larger than the light quantity of the blue light LB or the red light LR. Therefore, even if loss in light quantity is produced a little by cutting of the boundary light BL, the loss does not work on control of the white balance to disadvantage.

Further, in this projector 10, using displacement of the second lens 45b or the like arranged on the third optical path OP3 for green light, illuminance of the green light LG on the image forming area of the liquid crystal panel 51g can be adjusted. As described above, the green light LG has the large influence on the white balance, and the light source device 20 is easy to produce the unevenness in the relative light quantity of the green light LG. Therefore, using the displacement of the lens 45b or the like, the illuminance of the green light LG on the image forming area of the liquid crystal panel 51g can be adjusted, whereby the white balance of the projector 10 can be controlled efficiently. Further, as described above, in case of the high pressure mercury-vapor lamp, the light quantity of the green light LG tends to becomes large relatively. However, even if the light quantity loss is produced a little by enlargement of the illumination area caused by the displacement of the lens 45b, the loss does not work on control of the white balance to disadvantage. Preferably, from a point that the illumination light from the light source device 20 can be utilized to the maximum, the natural color temperature can be achieved and further the brightness image can be projected by the construction of the projector 10.

Further, as causes of influencing the white balance, in addition to the unevenness in the relative light quantity of the lamp, unevenness in characteristic of the liquid crystal panel 51g, and unevenness in wavelength selection characteristics of the dichroic mirrors 41a, 41b and the cross dichroic prism 60 are also through. However, according to the projector 10 in the exemplary embodiment, in spite of the various causes of giving the unevenness to the light quantity of the green light LG, the white balance of the projector 10 can almost set to a target value. In this time, the brightness and the contrast of the image are not sacrificed.

In the exemplary embodiment, though the half-wavelength of the first dichroic film 61 is 500 nm, the half-wavelength of the second dichroic film 62 is 510 nm, and the wavelength of the boundary light BL to be cut off is 500-510 nm, the above wavelengths are simply exemplification. For example, by setting the half-wavelength of the first dichroic film 61 at 490 nm, and setting the half-wavelength of the second dichroic film 62 at 500 nm, the wavelength of the boundary light BL to be cut off can be set at 490-500 nm.

Figure 5:
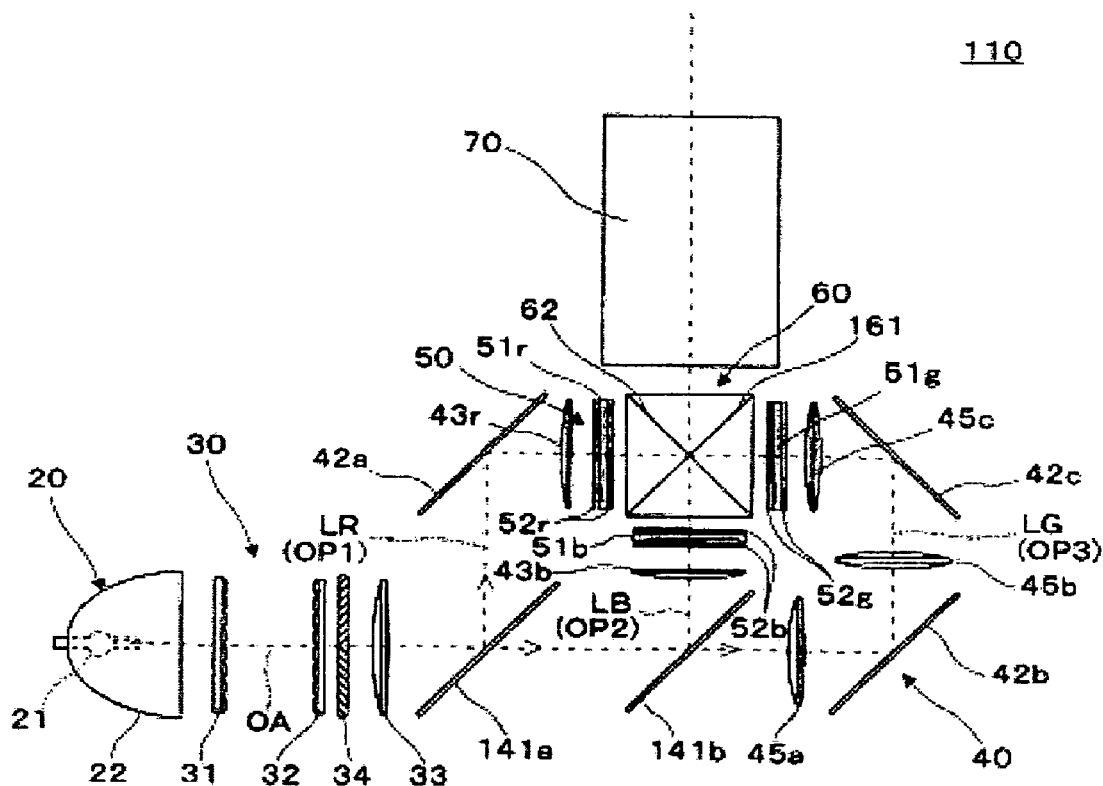
FIG. 5 is a diagram for explaining an optical system of a projector according to a second exemplary embodiment.

FIG. 5 is a diagram for explaining a projector according to a second exemplary embodiment. This projector 110 is obtained by partially modifying the projector 10 in the first exemplary embodiment shown in FIG. 1. Parts that are not particularly explained have the same structure as the structure of those of the projector 10 in the first exemplary embodiment. Further, common parts are denoted by the same reference numerals and their repeated description is omitted.

A color-separation optical system including first and second dichroic mirrors 141a and 141b of a dividing illumination system 40 separates illumination light into three luminous fluxes of red light LR, green light LG and blue light LB. Namely, the first dichroic mirror 141a reflects the red color LR of the three-color light of red, blue, and green, and transmits the green light LG and the blue light LB. Further, the second dichroic mirror 141b reflects the blue light LB of the green light LG and the blue light LB which have been incident thereon, and transmits the green light LG.

In an optical modulation part 50, the red light LR guided on a first optical path OP1 is incident through a field lens 43r on an image forming area of a liquid crystal panel 51r. The blue light LB guided on a second optical path OP2 is incident through a field lens 43b on an image forming area of a liquid crystal panel 51b. The green light LG guided on a third optical path OP3 is incident on an image forming area of a liquid crystal panel 51g through a relay optical system comprising lenses 45a, 45b, and 45c.

Inside a cross dichroic prism 60, a first dichroic film (specifically, dielectric multilayer film) for red light reflection 161, and a second dichroic film (specifically, dielectric multilayer film) for green light reflection 62 are arranged in the shape of an X character. In this cross dichroic prism 60, LB the red light LR from the liquid crystal panel 51r is reflected by the first dichroic film 161 thereby to be emitted to the left in the traveling direction, the blue light LB from the liquid crystal panel 51b is caused to go straight ahead and emitted through the both dichroic films 161 and 62, and the green light LG from the liquid crystal panel 51g is reflected by the second dichroic film 62 thereby to be emitted to the right in the traveling direction.

Figure 6:
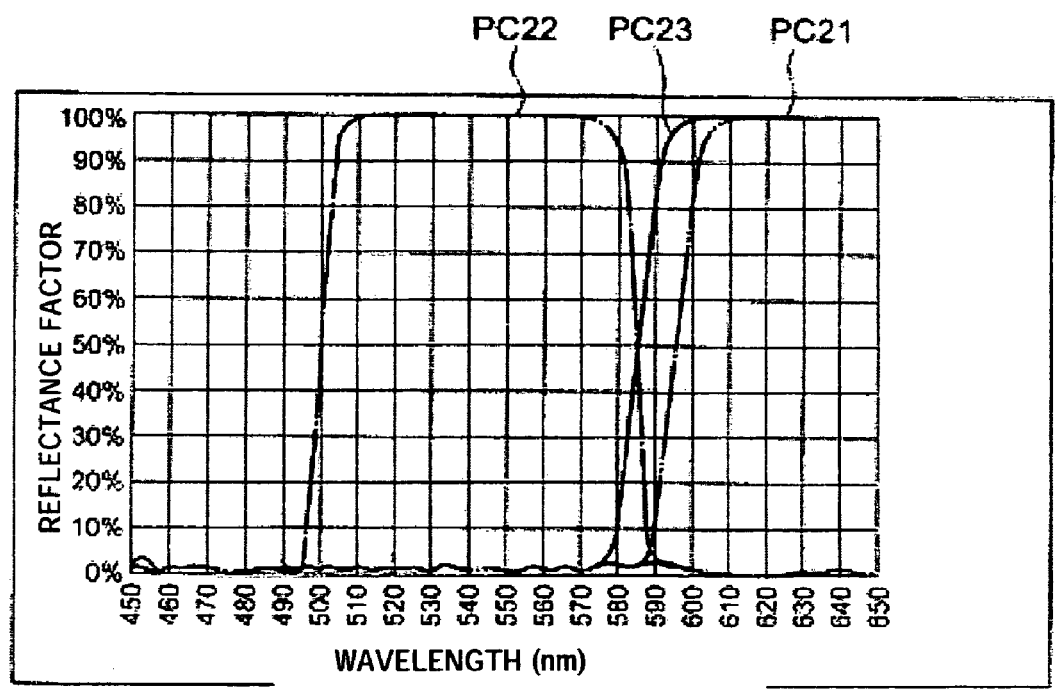
FIG. 6 is a graph showing reflection characteristic of a cross dichroic prism shown in FIG. 5.

FIG. 6 is a graph for explaining conceptually reflection characteristics of the dichroic films 161 and 62 constituting the cross dichroic prism 60 in FIG. 5. The first dichroic film 161 has reflection characteristic PC21 shown by chain double-dashed lines, and reflects the red light overall. Further, the second dichroic film 62 has reflection characteristic PC22 shown by chain lines, and reflects the green light overall. In result, the both dichroic films 161 and 62 transmit the blue light. In the reflection characteristic PC21 of the first dichroic film 161, a half wavelength in which a reflectance factor comes to 50% on a short-wavelength side is about 595 nm. In the reflection characteristic PC22 of the second dichroic film 62, a half wavelength in which a reflectance factor comes to 50% on a long-wavelength side is about 585 nm. Namely, the half wavelength of the second dichroic film 62 is longer than the half wavelength of the first dichroic film 161 by about 10 nm. Reflection characteristic PC23 shown by solid lines is a conventional type of reflection characteristic in which the reflection characteristic PC21 is changed on an edge position on the short-wavelength side, and a half wavelength in which a reflectance factor comes to 50% is about 585 nm. This value coincides with the half wavelength of the reflection characteristic PC22 of the second dichroic film 62.

Here, there is hardly an overlapping portion between the reflection characteristic PC21 of the first dichroic film 161 and the reflection characteristic PC22 of the second dichroic film 62. Namely, red-green boundary light in their boundary wavelength (585 to 595 nm) is hardly reflected on the first dichroic film 161 and also on the second dichroic film 62. Therefore, even if image light in the boundary wavelength which has entered into the cross dichroic prism 60 in FIG. 5 from the first optical path OP1 side is a little reflected by the first dichroic film 161, since the reflection amount on the second dichroic film 62 is nearly zero, it is possible to effectively prevent generation of return light which is formed by twice reflection of the red-green boundary light and reverses. On the other hand, even if image light in the boundary wavelength which has entered into the cross dichroic prism 60 from the third optical path OP3 side is a little reflected by the first dichroic film 161, since the reflection amount on the second dichroic film 62 is nearly zero, it is possible to effectively prevent the generation of return light which is formed by twice reflection of the red-green boundary light and reverses.

Figure 7:
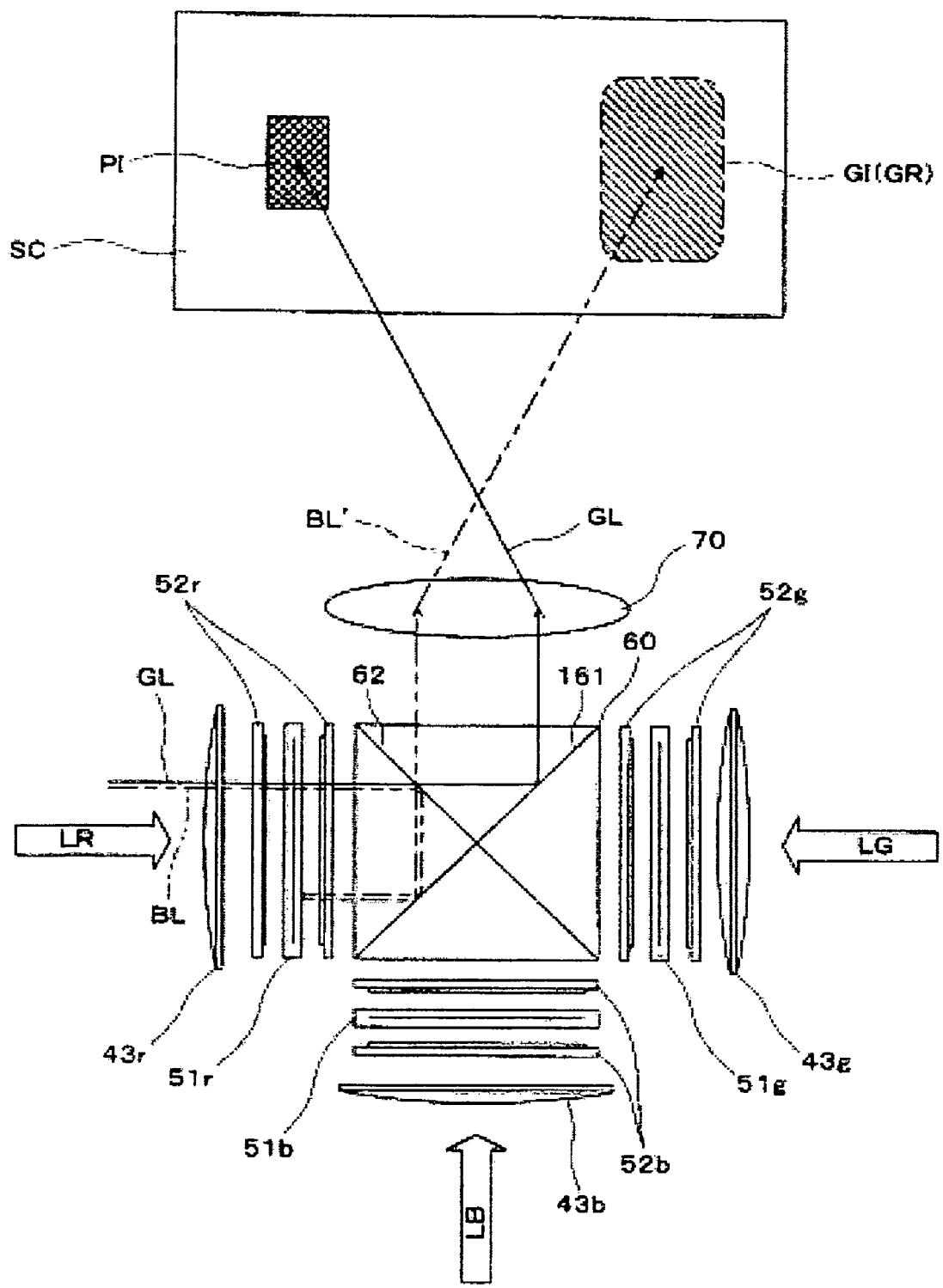
FIG. 7 is an enlarged view for explaining the characteristic operation of the projector in FIG. 5.

FIG. 7 is a diagram for explaining the prevention of generation of the return light from the cross dichroic prism 60. In this case, the boundary light BL in the wavelength 585 to 595 nm is guided to the liquid crystal panel 51r from the first optical path OP1 side. General light GL of the red light LR passes through the second dichroic film 62 completely, is reflected by the first dichroic film 161, is incident on a projection lens 70, and forms a red image on a screen SC. On the other hand, the boundary light BL of the red light LR that has passed through the liquid crystal panel 51r passes through both of the first and second dichroic films 161 and 62, and has hardly the influence on formation of a projection image.

In case that the first dichroic film 161 has the reflection characteristic PC23 shown in FIG. 6 as a comparative example, the boundary light BL of the red light LR that has passed through the liquid crystal panel 51r is partially reflected by the first and second dichroic films 161 and 62, and the reflected light is successively incident on the liquid crystal panel 51r or the like as the return light that has moved in parallel. The return light that has been incident on the liquid crystal panel 51r or the like is reflected by the liquid crystal panel 51r or the like and transmitted forward again as boundary light BL'. Such the boundary light BL' is partially reflected by the first dichroic film 161 as advance light, partially passes through the second dichroic film 62, is incident on the projection lens 70, and forms, at a ghost area GI on the screen SC, a weak ghost image corresponding to an image in an image area PI.

As described above, the boundary light BL of wavelength 585 to 595 nm is guided to the liquid crystal panel 51r from the first optical path OP1 side. However, it is also possible to guide the boundary light BL from the third optical path OP 3 side to the liquid crystal panel 51g. Also in this case, the generation of the ghost image can be similarly prevented.

In the embodiment, though the half-wavelength of the first dichroic film 161 is 595 nm, the half-wavelength of the second dichroic film 62 is 585 nm, and the wavelength of the boundary light BL to be cut off is 585-595 nm, the above wavelengths are simply exemplification. For example, by setting the half-wavelength of the first dichroic film 161 at 585 nm, and setting the half-wavelength of the second dichroic film 62 at 575 nm, the wavelength of the boundary light BL to be cut off can be set at 575-585 nm.

Figure 8:
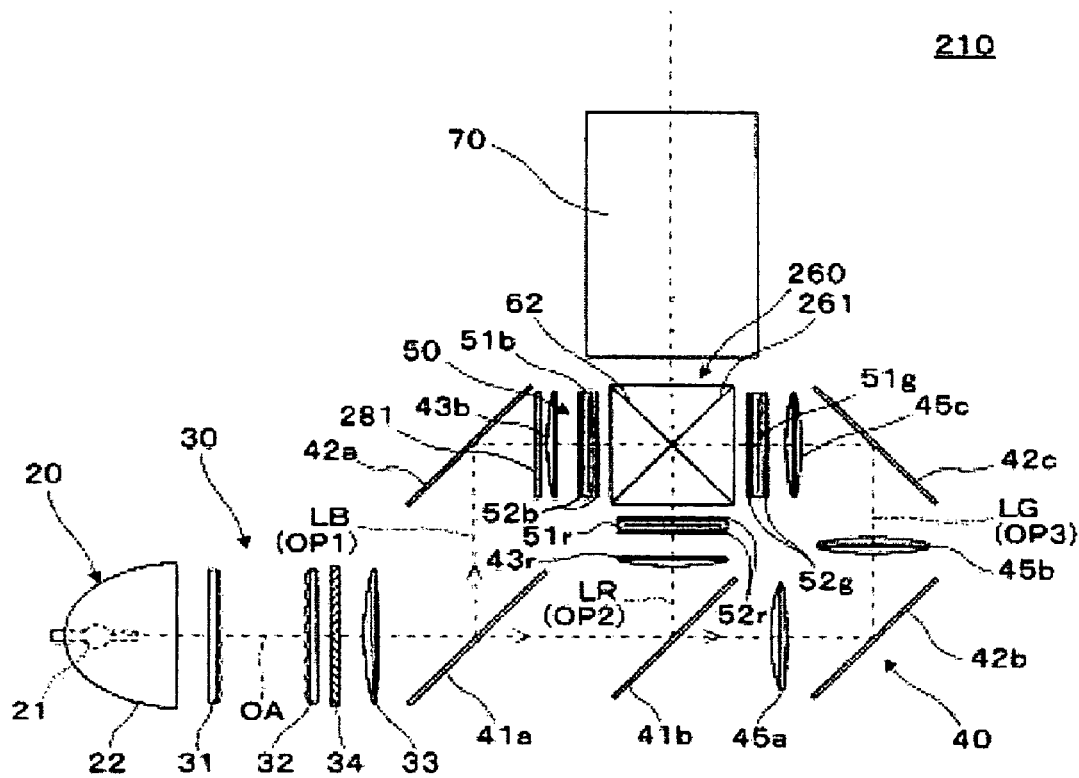
FIG. 8 is a diagram for explaining an optical system of a projector according to a third exemplary embodiment.

FIG. 8 is a diagram for explaining a projector according to a third exemplary embodiment. This projector 210 is obtained by partially modifying the projector 10 in the first exemplary embodiment shown in FIG. 1. Parts that are not particularly explained have the same structure as the structure of those of the projector 10 in the first exemplary embodiment. Further, common parts are denoted by the same reference numerals and their repeated description is omitted.

In case of the projector 210 according to the third exemplary embodiment, a bandpass filter 281 that is an optical element is provided on a first optical path OP1 to which blue light LB is guided. In the shown example, though the bandpass filter 281 is arranged between a reflection mirror 42a and a field lens 43b, this bandpass filter 281 can be arranged in any position on the optical path from a first dichroic mirror 41a to a cross dichroic prism 260.

Correspondingly to installation of such the bandpass filter 281, the cross dichroic prism 260 is a related art type. A half wavelength of a first dichroic film 261 coincides with a half wavelength of a second dichroic film 62, and its half wavelength is 500 nm.

Figure 9:
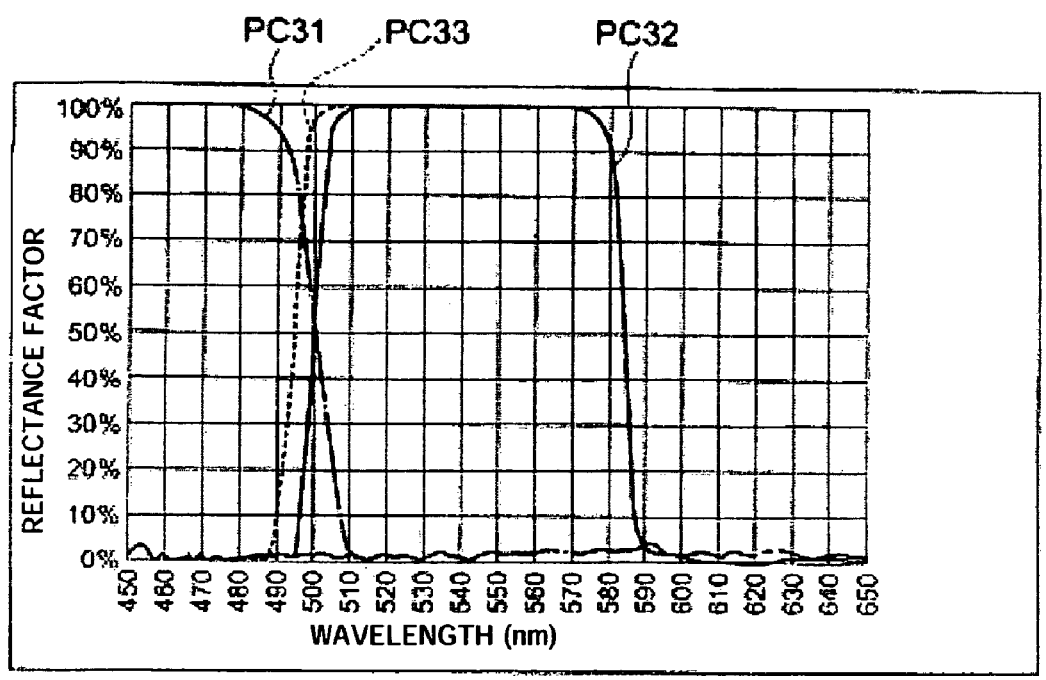
FIG. 9 is a graph showing reflection characteristic of a bandpass filter shown in FIG. 8.

FIG. 9 is a graph for explaining transmission characteristic or the like of the bandpass filter 281. In the graph, reflection characteristic PC31 shown by chain lines represents a reflectance factor of the first dichroic film 261 in the cross dichroic prism 260. Further, reflection characteristic PC32 shown by solid lines represents a reflectance factor of the second dichroic film 62. Further, reflection characteristic PC33 shown by dotted lines represents a reflectance factor of the bandpass filter 281. In the reflection characteristic PC33 of the bandpass filter 281, a half wavelength in which the reflectance factor comes to 50% on a long-wavelength side is about 495 nm, which can cut off boundary light of 495-505 nm effectively.

Further, the bandpass filter 281 may be a low-pass filter (what causes the short-wavelength to pass) in which the half wavelength is the same.

In case of this exemplary embodiment, though the both dichroic films 261 and 62 have the overlapping reflection characteristic, it is possible by the bandpass filter 281 to prevent blue-green boundary light from being incident on the cross dichroic prism 260 from the first optical path OP1. Therefore, it can be prevented that return light from the cross dichroic prism 260 is reflected by a liquid crystal panel 51b or the like thereby to become advance light and such the advance light forms a ghost image on a screen.

Figure 10:
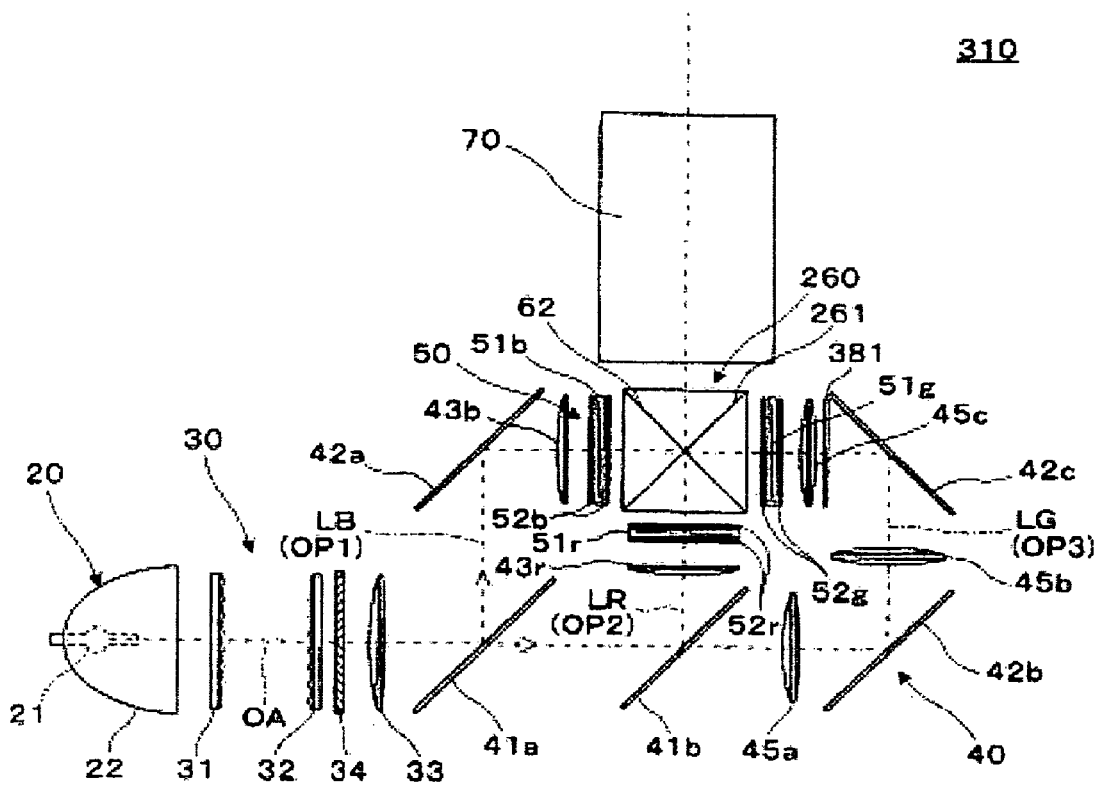
FIG. 10 is a diagram for explaining an optical system of a projector according to a fourth exemplary embodiment.

FIG. 10 is a diagram for explaining a projector according to a fourth exemplary embodiment. This projector 310 is obtained by partially modifying the projector 210 in the third embodiment shown in FIG. 8. Parts that are not particularly explained have the same structure as the structure of those of the projector 210 in the third exemplary embodiment. Further, common parts are denoted by the same reference numerals and their repeated description is omitted.

In case of the projector 310 according to the fourth exemplary embodiment, a bandpass filter 381 that is an optical element is provided on a third optical path OP3 to which green light LG is guided. In the shown example, though the bandpass filter 381 is arranged between a reflection mirror 42c and a lens 45c, this bandpass filter 381 can be arranged in any position on the optical path from a second dichroic mirror 41b to a cross dichroic prism 260.

Figure 11:
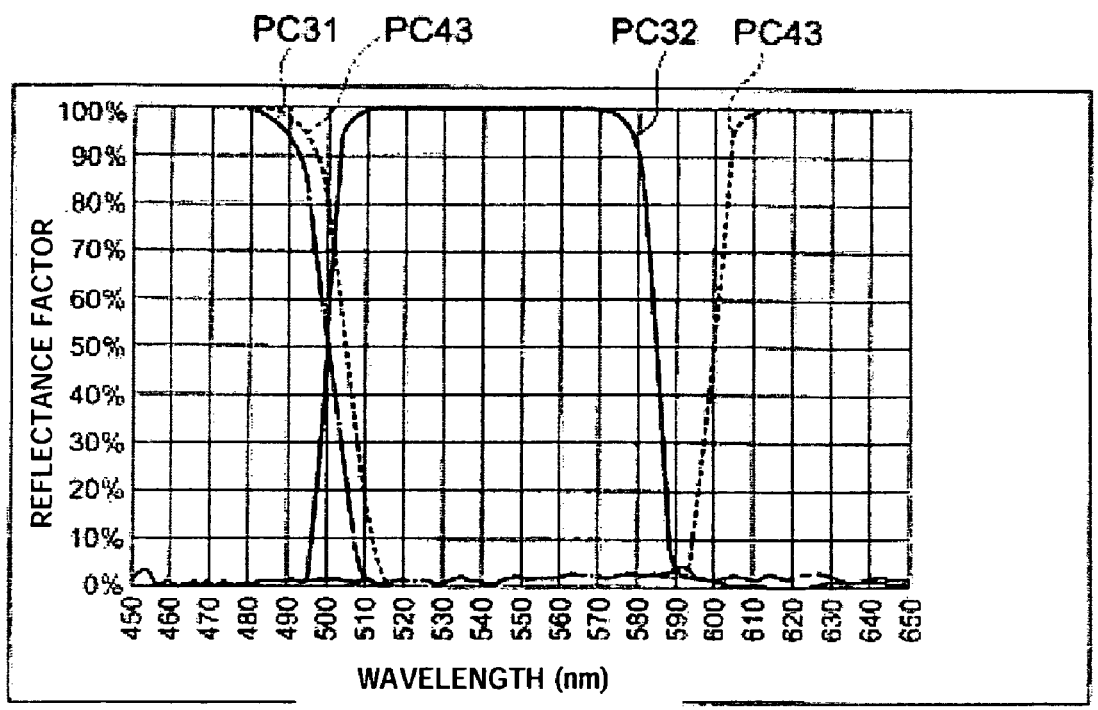
FIG. 11 is a graph showing reflection characteristic of a bandpass filter shown in FIG. 10.

FIG. 11 is a graph for explaining transmission characteristic or the like of the bandpass filter 381. In the graph, reflection characteristic PC31 shown by chain lines represents a reflectance factor of a first dichroic film 261 in the cross dichroic prism 260. Further, reflection characteristic PC32 shown by solid lines represents a reflectance factor of a second dichroic film 62. Further, reflection characteristic PC43 shown by dotted lines represents a reflectance factor of the bandpass filter 381. In the reflection characteristic PC43 of the bandpass filter 381, a half wavelength in which the reflectance factor comes to 50% on a short-wavelength side is about 505 nm, which can cut off boundary light of 495-505 nm effectively.

Further, the bandpass filter 381 may be a high-pass filter (what causes the long-wavelength to pass) in which the half wavelength is the same.

In case of this exemplary embodiment, it is possible by the bandpass filter 381 to prevent blue-green boundary light from being incident on the cross dichroic prism 260 from the third optical path OP3. Therefore, it can be prevented that return light from the cross dichroic prism 260 is reflected by a liquid crystal panel 51g or the like thereby to become advance light and such the advance light forms a ghost image on a screen.

Figure 12:
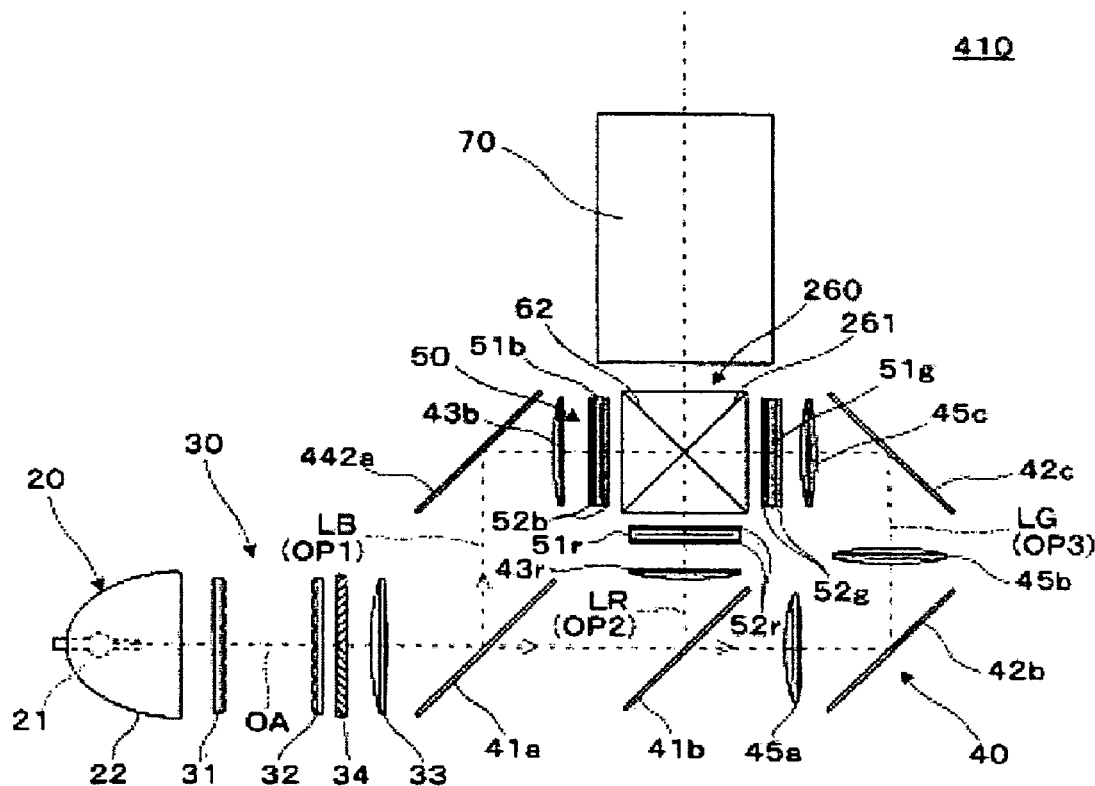
FIG. 12 is a diagram for explaining an optical system of a projector according to a fifth exemplary embodiment.

FIG. 12 is a diagram for explaining a projector according to a fifth exemplary embodiment. This projector 410 is obtained by partially modifying the projector 10 in the first exemplary embodiment shown in FIG. 1. Parts that are not particularly explained have the same structure as the structure of those of the projector 10 in the first exemplary embodiment. Further, common parts are denoted by the same reference numerals and their repeated description is omitted.

In case of the projector 410 according to the fifth embodiment, a reflection mirror 442a on a first optical path OP1 to which blue light LB is guided is used as a dichroic mirror that is an optical element.

Figure 13:
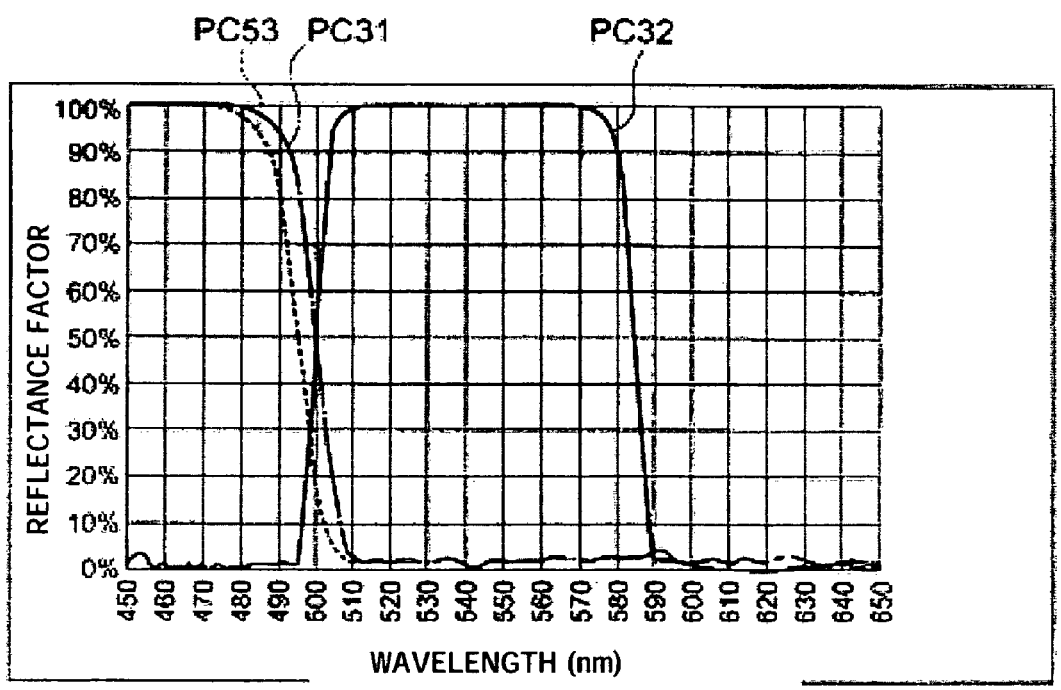
FIG. 13 is a graph showing reflection characteristic of a reflection mirror shown in FIG. 12.

FIG. 13 is a graph for explaining reflection characteristic or the like of the reflection mirror 442a. In the graph, reflection characteristic PC31 shown by chain lines represents a reflectance factor of a first dichroic film 261 in a cross dichroic prism 260. Further, reflection characteristic PC32 shown by solid lines represents a reflectance factor of a second dichroic film 62. Further, reflection characteristic PC53 shown by dotted lines represents a reflectance factor of the reflection mirror 442a. In the reflection characteristic PC53 of this reflection mirror 442a, a half wavelength in which the reflectance factor comes to 50% on a long-wavelength side is about 495 nm, which can cut off boundary light of 495-505 nm effectively.

In case this exemplary embodiment, it is possible by the reflection mirror 442a to prevent blue-green boundary light from being on the cross dichroic prism 260 from the first optical path OP1. Therefore, it can be prevented that return light from the cross dichroic prism 260 is reflected by a liquid crystal panel 51b or the like thereby to become advance light and such the advance light forms a ghost image on a screen.

Figure 14:
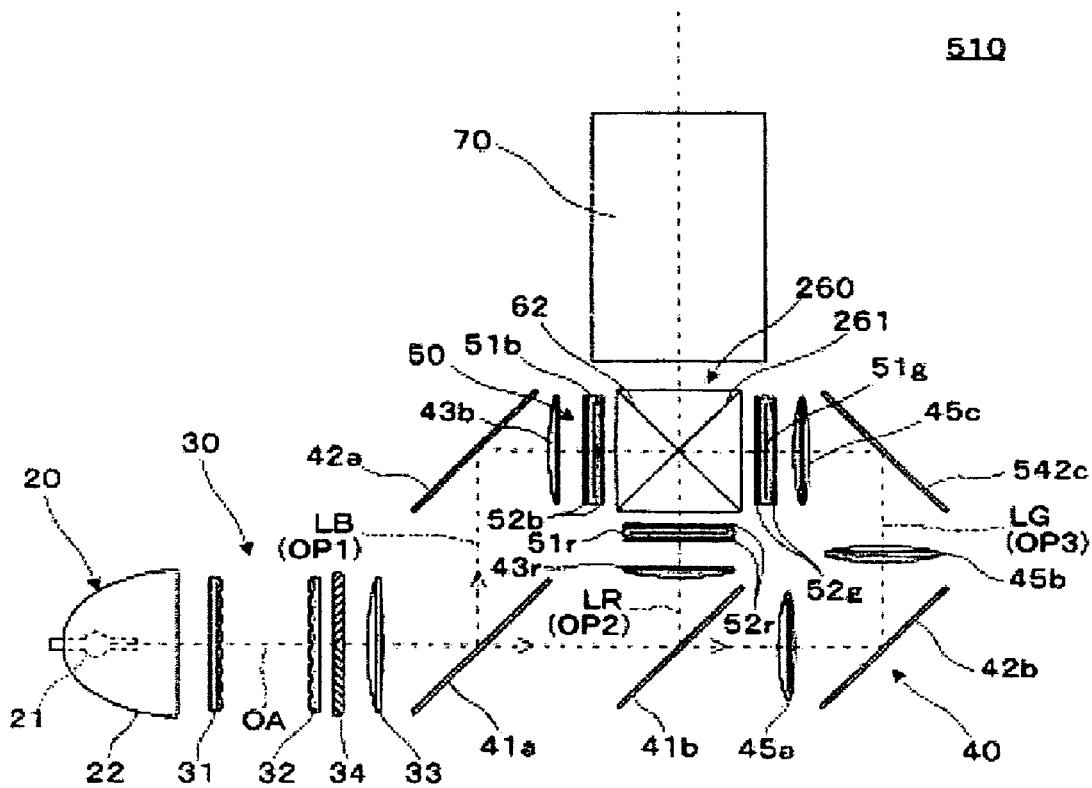
FIG. 14 is a diagram for explaining an optical system of a projector according to a sixth exemplary embodiment.

FIG. 14 is a diagram for explaining a projector according to a sixth exemplary embodiment. This projector 510 is obtained by partially modifying the projector 410 in the fifth exemplary embodiment shown in FIG. 12. Parts that are not particularly explained have the same structure as the structure of those of the projector 410 in the fifth exemplary embodiment. Further, common parts are denoted by the same reference numerals and their repeated description is omitted.

In case of the projector 510 according to the sixth exemplary embodiment, a reflection mirror 42a on a first optical path OP1 to which blue light LB is guided is used simply as a mirror, and a reflection mirror 542c on a third optical path OP3 to which green light LG is guided is used a dichroic mirror that is an optical element.

Figure 15:
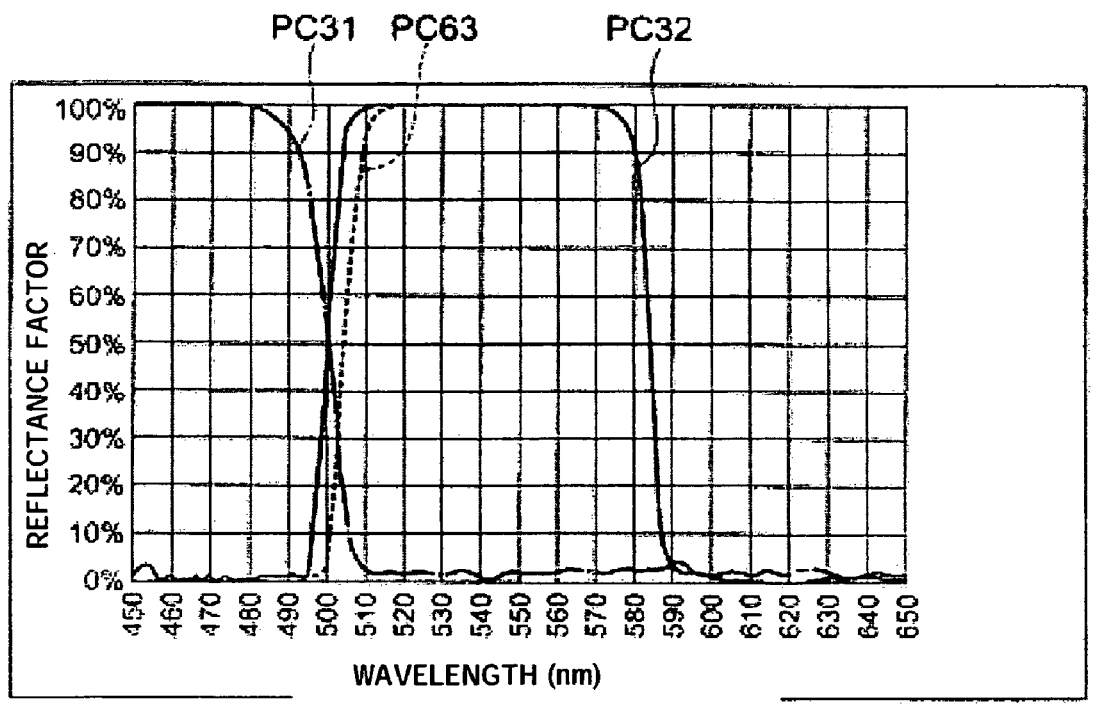
FIG. 15 is a graph showing reflection characteristic of a reflection mirror shown in FIG. 14.

FIG. 15 is a graph for explaining reflection characteristic or the like of the reflection mirror 542c. In the graph, reflection characteristic PC31 shown by chain lines represents a reflectance factor of a first dichroic film 261 in a cross dichroic prism 260. Further, reflection characteristic PC32 shown by solid lines represents a reflectance factor of a second dichroic film 62. Further, reflection characteristic PC63 shown by dotted lines represents a reflectance factor of the reflection mirror 542c. In the reflection characteristic PC63 of this reflection mirror 542c, a half wavelength in which the reflectance factor comes to 50% on a short-wavelength side is about 505 nm, which can cut off boundary light of 495-505 nm effectively.

In case of this exemplary embodiment, it is possible by the reflection mirror 542c to prevent blue-green boundary light from being incident on the cross dichroic prism 260 from the third optical path OP3. Therefore, it can be prevented that return light from the cross dichroic prism 260 is reflected by a liquid crystal panel 51g or the like thereby to become advance light and such the advance light forms a ghost image on a screen.

Figure 16:
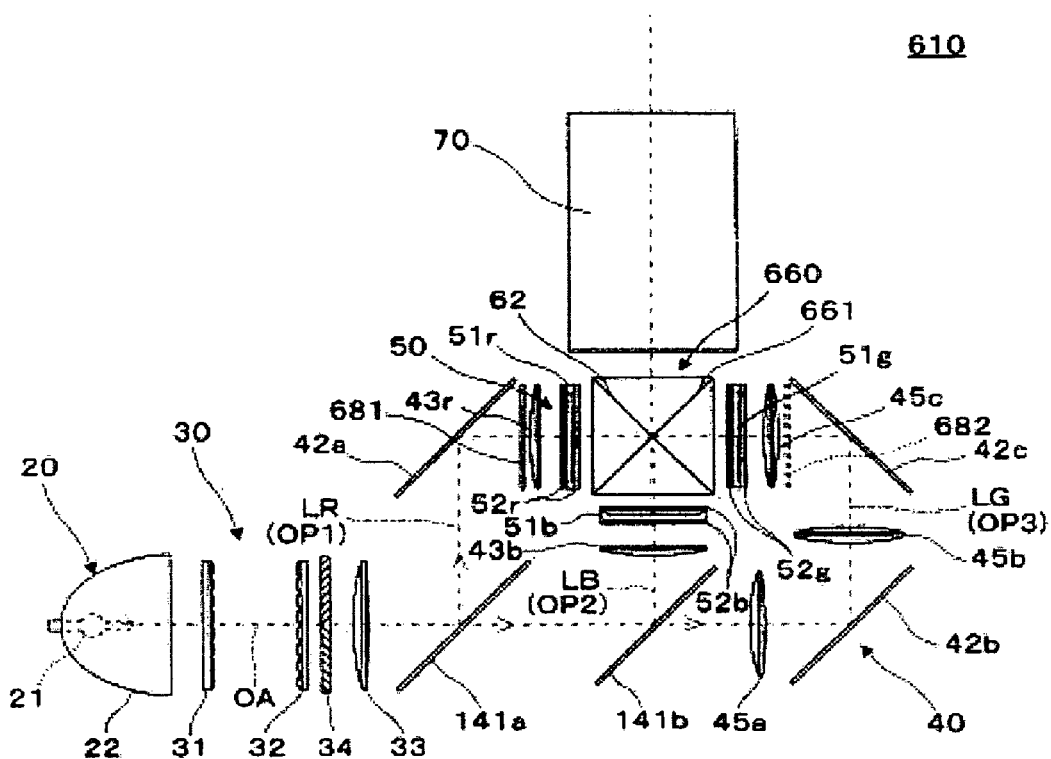
FIG. 16 is a diagram for explaining an optical system of a projector according to a sixth exemplary embodiment.

FIG. 16 is a diagram for explaining a projector according to a seventh exemplary embodiment. This projector 610 is obtained by partially modifying the projector 110 in the second embodiment shown in FIG. 5. Parts that are not particularly explained have the same structure as the structure of those of the projector 110 in the second exemplary embodiment. Further, common parts are denoted by the same reference numerals and their repeated description is omitted.

In case of the projector 610 according to the seventh exemplary embodiment, a bandpass filter 681 is provided on a first optical path OP1 to which red light LR is guided. Correspondingly to installation of such the bandpass filter 681, a cross dichroic prism 660 is a conventional type. A half wavelength of a first dichroic film 661 coincides with a half wavelength of a second dichroic film 62, and its half wavelength is 500 nm. Further, in place of the bandpass filter 681 on the first optical path OP1, a bandpass filter 682 can be also installed on a third optical path OP3.

Figure 17:
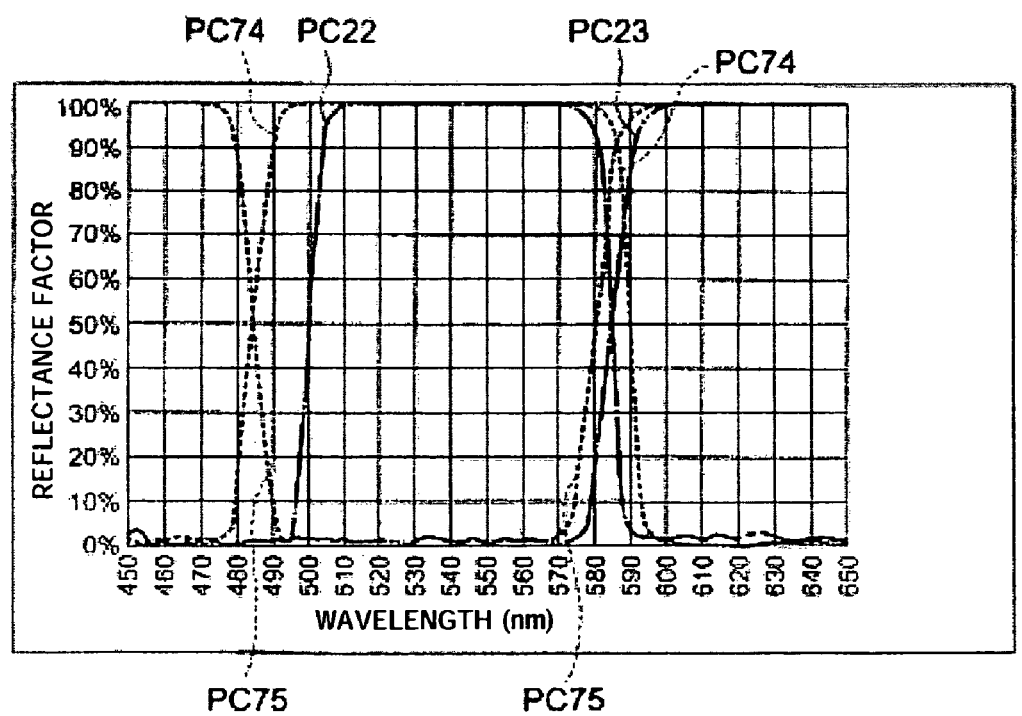
FIG. 17 is a graph showing reflection characteristic of a bandpass filter shown in FIG. 16.

FIG. 17 is a graph for explaining transmission characteristic or the like of the bandpass filter 681. In the graph, reflection characteristic PC23 shown by chain double-dashed lines represents a reflectance factor of the first dichroic film 661 in the cross dichroic prism 660. Further, reflection characteristic PC22 shown by chain lines represents a reflectance factor of the second dichroic film 62. Further, first reflection characteristic PC74 shown by dotted lines represents a reflectance factor of the bandpass filter 681 on the first optical path OP1. In the reflection characteristic PC74 of the bandpass filter 681, a half wavelength in which the reflectance factor comes to 50% on a long-wavelength side is about 590 nm, which can cut off boundary light of 580-590 nm effectively. On the other hand, second reflection characteristic PC75 shown by dotted lines represents a reflectance factor of the bandpass filter 682 on the third optical path OP3. In the reflection characteristic PC75 of the bandpass filter 682, a half wavelength in which the reflectance factor comes to 50% on a long-wavelength side is about 580 nm, which can cut off boundary light of 580 to 590 nm effectively.

In case of this exemplary embodiment, though the both dichroic films 661 and 62 have the overlapping reflection characteristics, it is possible by the bandpass filter 681,682 to prevent red-green boundary light from being incident on the cross dichroic prism 660. Therefore, it can be prevented that return light from the cross dichroic prism 660 is reflected by liquid crystal panels 51r and 51g or the like thereby to become advance light and such the advance light forms a ghost image on a screen.

Figure 18:
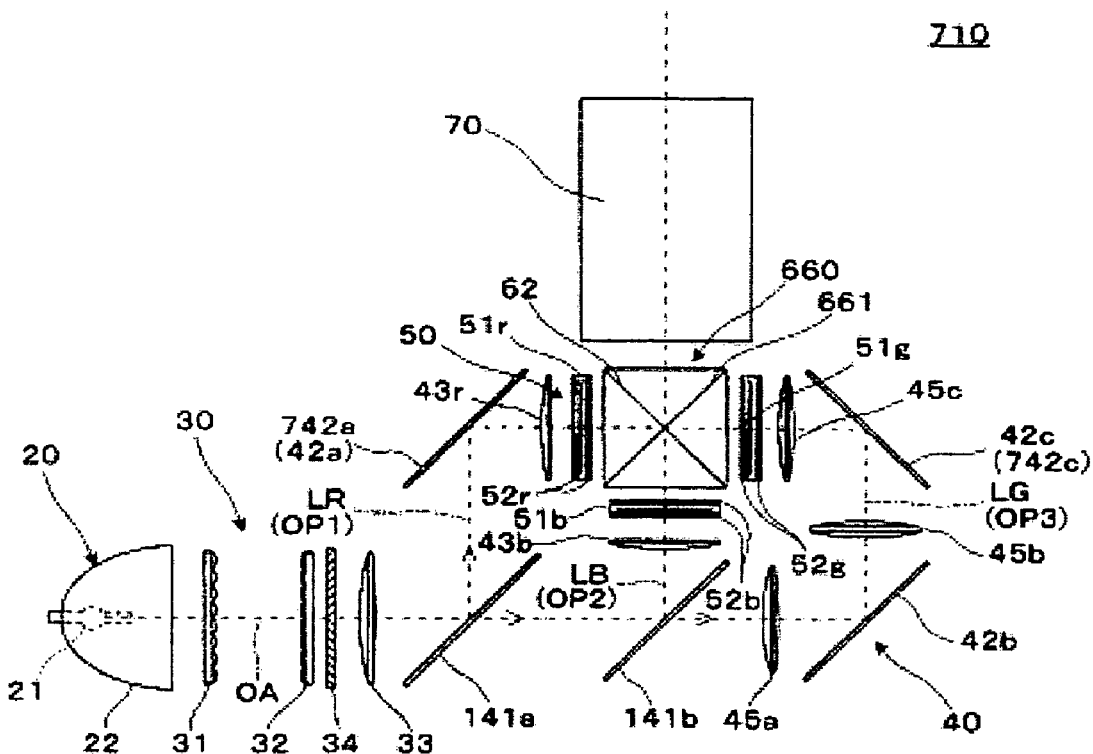
FIG. 18 is a diagram for explaining an optical system of a projector according to a seventh exemplary embodiment.

FIG. 18 is a diagram for explaining a projector according to an eighth exemplary embodiment. This projector 710 is obtained by partially modifying the projector 610 in the seventh exemplary embodiment shown in FIG. 16. Parts that are not particularly explained have the same structure as the structure of those of the projector 610 in the seventh exemplary embodiment. Further, common parts are denoted by the same reference numerals and their repeated description is omitted.

In case of the projector 710 according to the eighth embodiment, a reflection mirror 742a on a first optical path OP1 to which red light LR is guided is used as a dichroic mirror. Further, the mirror on the first optical path OP1 may be used as a usual reflection mirror 42a. In this case, a usual reflection mirror 42c provided on a third optical path OP3 to which green light LG is guided can be used as a reflection mirror 742c composed of a dichroic mirror.

Figure 19:
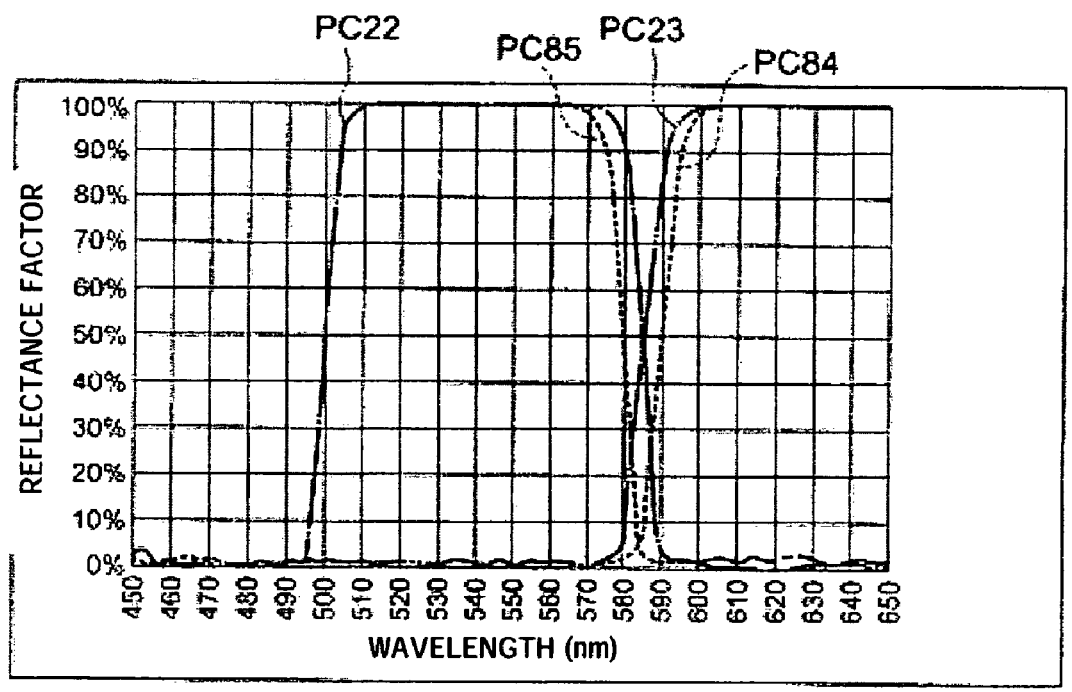
FIG. 19 is a graph showing reflection characteristic of a bandpass filter shown in FIG. 18.

FIG. 19 is a graph for explaining reflection characteristic or the like of the reflection mirror 742a. In the graph, reflection characteristic PC23 shown by chain double-dashed lines represents a reflectance factor of the first dichroic film 661 in a cross dichroic prism 660. Further, reflection characteristic PC22 shown by chain lines represents a reflectance factor of the second dichroic film 62. Further, first reflection characteristic PC84 shown by dotted lines represents a reflectance factor of the reflection mirror 742a provided on the first optical path OP1. In the reflection characteristic PC84 of the reflection mirror 742a, a half wavelength in which the reflectance factor comes to 50% on a short-wavelength side is about 590 nm, which can cut off boundary light of 580-590 nm effectively. On the other hand, second reflection characteristic PC85 shown by dotted lines represents a reflectance factor of the reflection mirror 742c on the third optical path OP3. In the reflection characteristic PC85 of the reflection mirror 742c, a half wavelength in which the reflectance factor comes to 50% on a long-wavelength side is about 580 nm, which can cut off boundary light of 580-590 nm effectively.

In case of this exemplary embodiment, though the both dichroic films 661 and 62 have the overlapping reflection characteristics, it is possible by the reflection mirror 742a, 742c to prevent red-green boundary light from being incident on the cross dichroic prism 660. Therefore, it can be prevented that return light from the cross dichroic prism 660 is reflected by liquid crystal panel 51r, 51g or the like thereby to become advance light and such the advance light forms a ghost image on a screen.

It should be understood that the invention is not limited to the exemplary embodiments, but can be executed in various embodiments without departing from the spirit of the invention. For example, the following modifications can be also performed.

In the projectors 10 to 710 in the exemplary embodiments, the high pressure mercury-vapor lamp is used as the light source device 20. However, in place of the high pressure mercury-vapor lamp, other lamps such as a metal haloid lamp and the like can be also used.

Further, in the exemplary embodiments, in order to divide the light from the light source device 20 into the plural partial luminous fluxes, the two fly's eye optical systems 31 and 32 are used. However, the invention can be also applied to a projector which does not use such the fly's eye optical system, that is, the lens array. Further, the fly's eye optical systems 31 and 32 can be also replaced with a rod integrator.

Further, in the projector 10, though the polarizing conversion member 34 which converts the light from the light source 20 into the polarization in the specified direction is used, the invention can be also applied to a projector which does not use such the polarizing conversion member 34.

Further, as projectors, there are a front surface projector which performs image projection from a direction in which a viewer observes a projection surface, and a back surface projector which performs the image projection from the opposite side to the direction in which the viewer observes the projection surface. The constitution of the projector shown in FIG. 1 can be applied to the both projectors.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
three optical modulators that modulate respectively red light, green light, and blue light;
a color-synthetic optical system that synthesizes the light modulated by the three optical modulators; and
a projection optical system that projects the light synthesized by the color-synthetic optical system,
the color-synthetic optical system including a first reflection film that reflects the green light and transmits the blue light, and a second reflection film that reflects the blue light,
the first reflection film and the second reflection film being arranged in the shape of an X character, and
a first wavelength in which a reflectance factor of the first reflection film reaches 50% being longer than a second wavelength in which a reflectance factor of the second reflection film reaches 50%.

2. The projector according to claim 1, further comprising:
a color-separation optical system that separates light emitted from a light source into the red light, the green light, and the blue light, thereby providing the separated light as predetermined polarized light.

3. The projector according to claim 2,
an optical path between the light source and the optical modulator for green light being longer than an optical path between the light source and the optical modulator for red light or blue light; and
between the color-separation optical system and the optical modulator for green light, a relay optical system being arranged, which has a first lens arranged on a light exit side of the color-separation optical system, a second lens arranged on a light incident side of the optical modulator for green light, and a third lens arranged between the first lens and the second lens.

4. A projector, comprising:
three optical modulators that modulate respectively red light, green light, and blue light;
a color-synthetic optical system that synthesizes the light modulated by the three optical modulators; and
a projection optical system which projects the light synthesized by the color-synthetic optical system,
the color-synthetic optical system including a first reflection film that reflects the green light, and a second reflection film that reflects the blue light,
the first reflection film and the second reflection film being arranged in the shape of an X character,
a reflectance characteristic of the first reflection film and a reflectance characteristic of the second reflection film being partially superimposed in a predetermined wavelength area, and
a filter that removes the light in the predetermined wavelength area provided in the optical path for green light or blue light.

5. The projector according to claim 4, the filter being a transmission type optical element which suppresses transmission of the light in the predetermined wavelength area.

6. The projector according to claim 4, the filter being a reflection type optical element which suppresses reflection of the light in the predetermined wavelength area.

7. The projector according to claim 4, further comprising:
a color-separation optical system that separates light emitted from a light source into the red light, the green light, and the blue light, thereby providing the separated light as predetermined polarized light.

8. The projector according to claim 7,
an optical path between the light source and the optical modulator for green light being longer than an optical path between the light source and the optical modulator for red light or blue light; and
between the color-separation optical system and the optical modulator for green light, a relay optical system being arranged, which has a first lens arranged on a light exit side of the color-separation optical system, a second lens arranged on a light incident side of the optical modulator for green light, and a third lens arranged between the first lens and the second lens.

* * * * *